(12) United States Patent
Yokono et al.

(10) Patent No.: US 10,156,212 B2
(45) Date of Patent: Dec. 18, 2018

(54) CONTROLLER AND CONTROL METHOD FOR INTERNAL COMBUSTION ENGINE

(71) Applicant: Mitsubishi Electric Corporation, Tokyo (JP)

(72) Inventors: Michihisa Yokono, Hyogo (JP); Hideki Hagari, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 173 days.

(21) Appl. No.: 15/193,265

(22) Filed: Jun. 27, 2016

(65) Prior Publication Data

US 2017/0204814 A1    Jul. 20, 2017

(30) Foreign Application Priority Data

Jan. 18, 2016    (JP) ................... 2016-006768

(51) Int. Cl.
| | |
|---|---|
| *F02M 26/00* | (2016.01) |
| *F02M 26/47* | (2016.01) |
| *F02D 41/14* | (2006.01) |
| *F02D 41/00* | (2006.01) |
| *F02D 37/02* | (2006.01) |

(52) U.S. Cl.
CPC .............. *F02M 26/47* (2016.02); *F02D 37/02* (2013.01); *F02D 41/0072* (2013.01); *F02D 41/144* (2013.01); *F02D 41/1454* (2013.01); *F02D 2041/0017* (2013.01); *F02D 2200/0406* (2013.01); *F02D 2200/0414* (2013.01); *F02D 2200/0418* (2013.01); *Y02T 10/47* (2013.01)

(58) Field of Classification Search
CPC ............. F02D 41/0072; F02D 41/1454; F02D 41/144; F02D 37/02; F02D 2041/0017; F02D 2200/0414; F02D 2200/0418
See application file for complete search history.

(56) References Cited

U.S. PATENT DOCUMENTS

| | | | |
|---|---|---|---|
| 4,168,683 A | 9/1979 | Hata et al. | |
| 6,058,904 A * | 5/2000 | Kruse | ................... F02B 41/00 123/295 |

(Continued)

FOREIGN PATENT DOCUMENTS

| | | |
|---|---|---|
| JP | 58-55345 B2 | 12/1983 |
| JP | 5642222 B2 | 12/2014 |

OTHER PUBLICATIONS

Communication dated Jun. 21, 2016, issued by the Japan Patent Office in corresponding Japanese Application No. 2016-006768.

*Primary Examiner* — Hieu T Vo
*Assistant Examiner* — Sherman Manley
(74) *Attorney, Agent, or Firm* — Sughrue Mion, PLLC; Richard C. Turner

(57) ABSTRACT

There is provided an internal combustion engine controller and a control method thereof that can accurately estimate an EGR rate even when the humidity of intake air (the atmospheric air) changes. In the internal combustion engine controller and the control method thereof, an EGR rate is calculated based on an inner-manifold water vapor partial pressure ratio calculated based on a manifold pressure, a manifold temperature, and a manifold humidity and an inner-intake-air water vapor partial pressure ratio calculated based on an intake-air pressure, an intake-air temperature, and an intake-air humidity.

15 Claims, 5 Drawing Sheets

(56) References Cited

U.S. PATENT DOCUMENTS

| | | | | |
|---|---|---|---|---|
| 6,148,616 A | * | 11/2000 | Yoshida | F02B 37/24 60/605.2 |
| 7,715,976 B1 | * | 5/2010 | Xiao | F02M 26/46 123/406.48 |
| 2010/0326408 A1 | * | 12/2010 | Clarke | F02B 29/0406 123/568.21 |
| 2014/0014079 A1 | * | 1/2014 | Yacoub | F02D 41/144 123/568.16 |
| 2014/0109568 A1 | * | 4/2014 | Glugla | F02D 41/10 60/599 |
| 2014/0222318 A1 | | 8/2014 | Ramappan et al. | |
| 2014/0261344 A1 | | 9/2014 | Makino et al. | |
| 2014/0338644 A1 | * | 11/2014 | MacNeille | F02D 37/02 123/568.22 |
| 2016/0123255 A1 | * | 5/2016 | Ban | F02D 41/0065 123/559.2 |
| 2016/0146137 A1 | * | 5/2016 | Hagari | F02D 41/0072 123/350 |
| 2017/0284323 A1 | * | 10/2017 | Hagari | F02D 41/0052 |

\* cited by examiner

CONTROLLER AND CONTROL METHOD FOR INTERNAL COMBUSTION ENGINE

INCORPORATION BY REFERENCE

The disclosure of Japanese Patent Application No. 2016-6768 filed on Jan. 18, 2016 including its specification, claims and drawings, is incorporated herein by reference in its entirety.

BACKGROUND

The present invention relates to a controller and a control method for an internal combustion engine that is provided with an intake path and an exhaust path, a throttle valve for opening and closing the intake path, and an EGR path for recirculating exhaust gas from the exhaust path to an intake manifold that is part of the intake path and is at the downstream side of the throttle valve.

In order to appropriately control an internal combustion engine, it is important to accurately calculate the amount of air taken into a cylinder and to accurately control the fuel supply amount and the ignition timing in accordance with the cylinder intake air amount. Ignition timing control needs to change an ignition timing to the ignition timing (MBT: Minimum Spark Advance for Best Torque) at which the output torque becomes maximal or the like, in accordance with not only the rotation speed of the internal combustion engine and the cylinder intake air amount but also other factors such as the coolant temperature of the internal combustion engine, whether or not a knock has occurred, the fuel property, and the EGR (Exhaust Gas Recirculation) rate.

Meanwhile, with regard to the EGR, there are two methods, i.e., a method (referred to as an external EGR, hereinafter) in which an EGR valve is provided in an EGR path for recirculating exhaust gas from the exhaust path to the intake manifold and the amount of exhaust gas to be recirculated to the intake manifold is controlled based on the opening degree of the EGR valve and a method (referred to as an internal. EGR, hereinafter) in which a variable valve timing mechanism, which makes the opening/closing timings of one of or both of an intake valve and an exhaust valve variable, is provided and an overlap period, during which the intake valve and the exhaust valve are concurrently opened, is changed so that the amount of exhaust gas remaining in the cylinder is controlled. In recent years, in order to reduce the fuel cost and raise the output, the number of internal combustion engines provided with both the external EGR mechanism and the internal EGR mechanism has been increasing. In the present invention, an EGR and an EGR rate, when simply described in this manner, denote an external EGR and an external EGR rate, respectively.

In recent years, an internal combustion engine has been controlled by utilizing, as an index, the output torque of the internal combustion engine. Because the thermal efficiency changes depending on the cylinder intake air amount and the EGR rate, it is required to estimate the output torque based on the cylinder intake air amount and the EGR rate. Accordingly, either in order to control the ignition timing or in order to estimate the output torque, it is required to accurately estimate the EGR rate.

As a technology for estimating an EGR rate, for example, the technologies disclosed in Japanese Patent No. 5642222 and Japanese Examined Patent Publication No. S58-55345 have already been known. In the technology disclosed in Japanese Patent No. 5642222, by use of the intake air amount detected by an air flow sensor, the cylinder flow rate, which is the amount of air that flows into the cylinder and is calculated based on the pressure in the intake manifold or the like, and the opening degree of the EGR valve, the variation in the characteristics of the EGR valve and the change with time thereof are learned so that the EGR amount is estimated.

The technology disclosed in Japanese Examined Patent Publication No. S58-55345 is to perform feedback control of the opening degree of an EGA valve so that the $CO_2$ (carbon dioxide) concentration detected by a $CO_2$ concentration sensor provided in the intake manifold approaches a target value. Japanese Examined Patent Publication No. S58-55345 also discloses a configuration in which instead of a $CO_2$ concentration sensor, a humidity sensor is provided.

SUMMARY

In the technology disclosed in Japanese Patent No. 5642222, it is not required to add a dedicated sensor for estimating an EGR amount and hence the cost hike is not caused by the increase in the number of components; however, because the EGR amount is indirectly estimated, there has been a problem that an estimation error is caused by the individual differences, the changes with time, and the like in the respective characteristics of internal combustion engines and various kinds of sensors.

In the technology disclosed in Japanese Examined Patent Publication No. S58-55345, the EGR amount is feedback-controlled based on the humidity in the intake manifold; however, because the effect of the humidity of intake air that is newly taken into the intake manifold from the atmosphere, i.e., the effect of the humidity of the atmospheric air, which influences to the humidity in the intake manifold, is not taken into consideration, there has been a problem that an error in controlling the EGR amount is caused. Because the humidity of the atmospheric air largely changes depending on the district, the season, the weather, and the like, the error in controlling the EGR amount exceeds the upper limit that can be neglected.

Therefore, there is required an internal combustion engine controller and a control method thereof that can accurately estimate an EGR rate even when the humidity of intake air (the atmospheric air) changes.

An internal combustion engine controller according to the present invention is a controller for an internal combustion engine that is provided with an intake path and an exhaust path, a throttle valve for opening and closing the intake path, and an EGR path for recirculating exhaust gas from the exhaust path to an intake manifold that is part of the intake path and is at the downstream side of the throttle valve; the internal combustion engine controller includes a driving-condition detector that detects a manifold pressure, which is a pressure of gas in the intake manifold, a manifold temperature, which is a temperature of gas in the intake manifold, a manifold humidity, which is a humidity of gas in the intake manifold, an intake-air pressure, which is a pressure of intake air to be taken into the intake path, an intake-air temperature, which is a temperature of the intake air, and an intake-air humidity, which is a humidity of the intake air;

an inner-manifold water vapor ratio calculator that calculates an inner-manifold water vapor partial pressure, which is a partial pressure of water vapor included in gas inside the intake manifold, based on the manifold humidity and the manifold temperature, so as to calculate an inner-manifold water vapor partial pressure ratio, which is the ratio of the inner-manifold water vapor partial pressure to the manifold pressure;

an inner-intake-air water vapor ratio calculator that calculates an inner-intake-air water vapor partial pressure, which is a partial pressure of water vapor included in the intake air, based on the intake-air humidity and the intake-air temperature, so as to calculate an inner-intake-air water vapor partial pressure ratio, which is the ratio of the inner-intake-air water vapor partial pressure to the intake-air pressure; and an EGR rate calculator that calculates an EGR rate, which is a rate of the exhaust gas, recirculated into the intake manifold, to gas in the intake manifold, based on the inner-manifold water vapor partial pressure ratio and the inner-intake-air water vapor partial pressure ratio.

An internal combustion engine control method according to the present invention is a control method for an internal combustion engine that is provided with an intake path and an exhaust path, a throttle valve for opening and closing the intake path, and an EGA path for recirculating exhaust gas from the exhaust path to an intake manifold that is part of the intake path and is at the downstream side of the throttle valve; the control method includes:

a driving-condition detecting that detects a manifold pressure, which is a pressure of gas in the intake manifold, a manifold temperature, which is a temperature of gas in the intake manifold, a manifold humidity, which is a humidity of gas in the intake manifold, an intake-air pressure, which is a pressure of intake air to be taken into the intake path, an intake-air temperature, which is a temperature of the intake air, and an intake-air humidity, which is a humidity of the intake air;

an inner-manifold water vapor ratio calculating that calculates an inner-manifold water vapor partial pressure, based on the manifold humidity and the manifold temperature, so as to calculate an inner-manifold water vapor partial pressure ratio, which is the ratio of the inner-manifold water vapor partial pressure to the manifold pressure;

an inner-intake-air water vapor ratio calculating that calculates an inner-intake-air water vapor partial pressure, which is the partial pressure of water vapor included in the intake air, based on the intake-air humidity and the intake-air temperature, so as to calculate an inner-intake-air water vapor partial pressure ratio, which is the ratio of the inner-intake-air water vapor partial pressure to the intake-air pressure; and an EGR rate calculating that calculates an EGR rate, which is the rate of the exhaust gas, recirculated into the intake manifold, to gas in the intake manifold, based on the inner-manifold water vapor partial pressure ratio and the inner-intake-air water vapor partial pressure ratio.

The internal combustion engine controller and the control method thereof according to the present invention makes it possible to estimate an EGR rate by considering not only the humidity of a mixture gas consisting of air in an intake manifold and recirculation exhaust gas but also the humidity of intake air to be taken from the atmospheric air into the intake path. Thus, even when the humidity of the atmospheric air changes, the EGR rate can be estimated precisely.

DETAILED DESCRIPTION OF THE EMBODIMENTS

1. Embodiment 1

Figure 1:
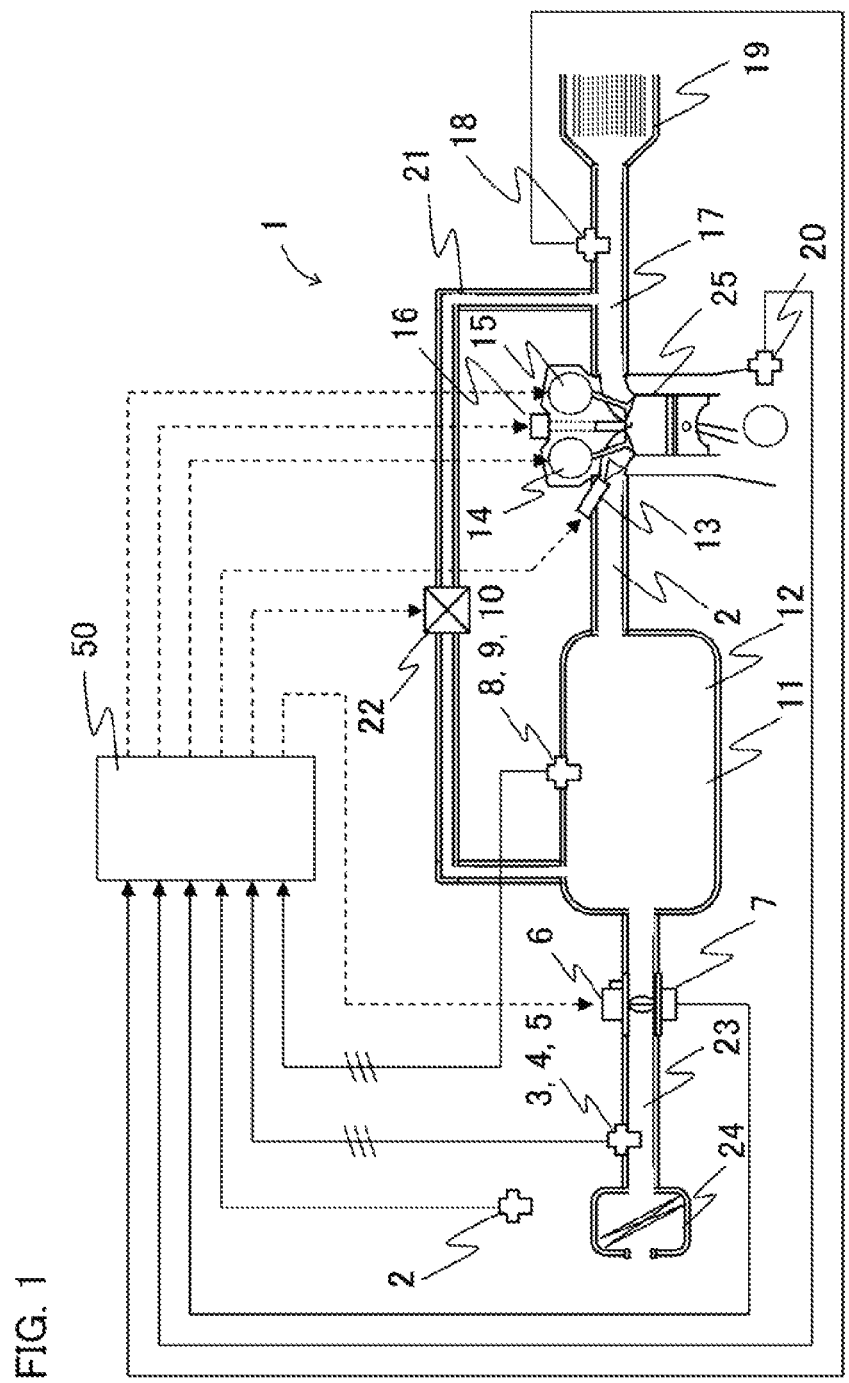
FIG. 1 is a schematic configuration diagram of an internal combustion engine and a controller according to Embodiment 1 of the present invention.
Figure 2:
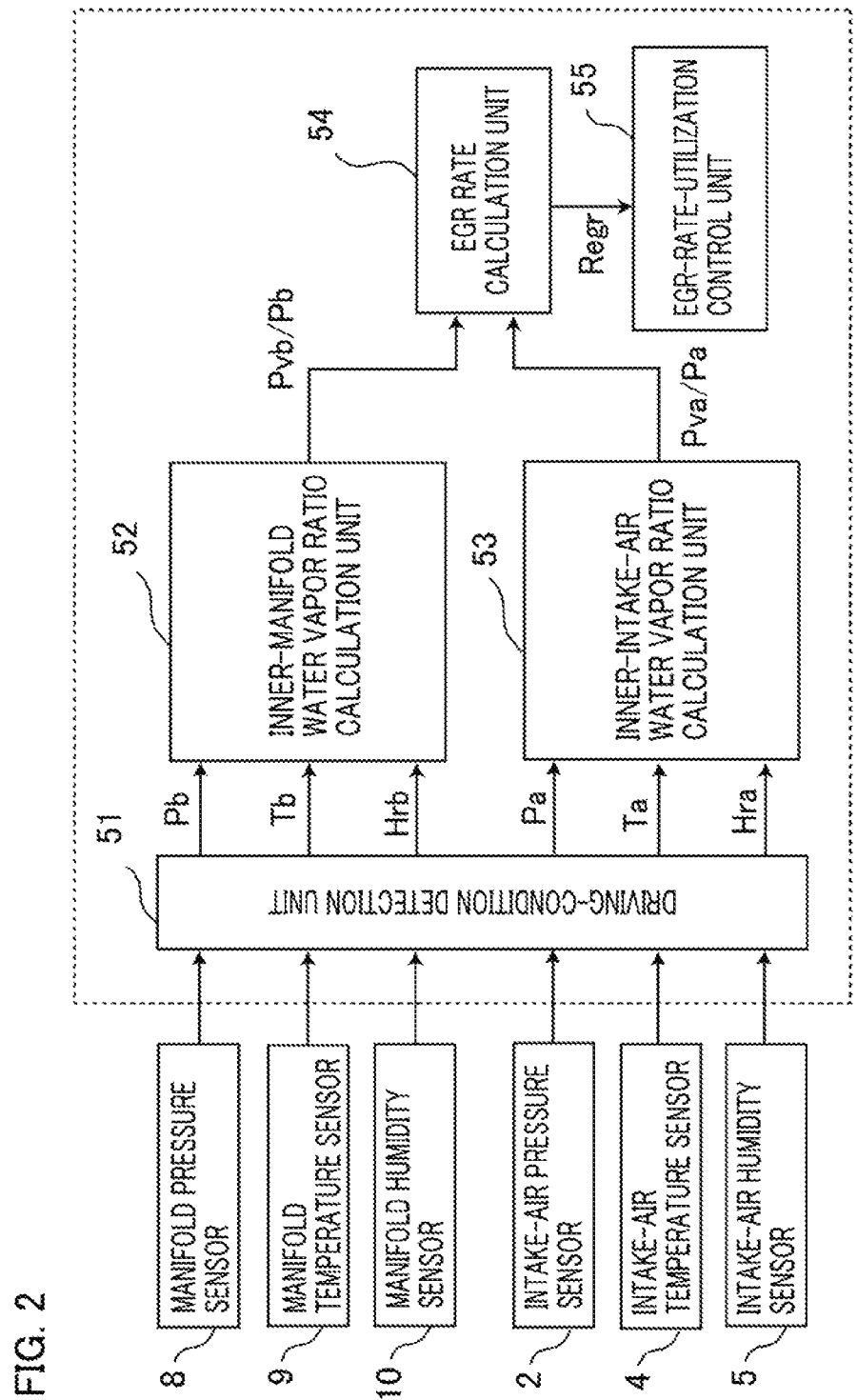
FIG. 2 is a block diagram of the controller according to Embodiment 1 of the present invention.

A controller 50 for an internal combustion engine 1 (hereinafter, referred to simply as a controller 50) according to Embodiment 1 will be explained with reference to drawings. FIG. 1 is a schematic configuration diagram of the internal combustion engine 1 and the controller 50; FIG. 2 is a block diagram of the controller 50 according to Embodiment 1. The internal combustion engine 1 and the controller 50 are mounted in a vehicle; the internal combustion engine 1 functions as a driving-force source for the vehicle (wheels).

1-1. The Configuration of the Internal Combustion Engine 1

At first, the configuration of the internal combustion engine 1 will be explained. The internal combustion engine 1 has a cylinder 25 in which a fuel-air mixture is combusted. The internal combustion engine 1 has an intake path 23 for supplying air to the cylinder 25 and an exhaust path 17 for discharging exhaust gas combusted in the cylinder 25. The internal combustion engine 1 has a throttle valve 6 for opening and closing the intake path 23. The throttle valve 6 is an electronically controlled throttle valve that opening/closing-driven by an electric motor controlled by the controller 50. The throttle valve 6 is provided with a throttle opening degree sensor 7 that generates an electric signal corresponding to a throttle opening degree of the throttle valve 6.

An air cleaner 24 for purifying air taken into the intake path 23 is provided at the most upstream portion of the intake path 23. In the intake path 23 at the upstream side of the throttle valve 6, there are provided an air flow sensor 3 that outputs an electric signal corresponding to the flow rate of intake air, which is air to be taken from the atmosphere into the intake path 23, an intake-air temperature sensor 4 that outputs an electric signal corresponding to an intake-air temperature Ta, which is the temperature of intake air, and an intake-air humidity sensor 5 that outputs an electric signal corresponding to an intake-air humidity Hra, which is the humidity of intake air. The pressure in the intake path 23 at the upstream side of the throttle valve 6 can be regarded as equal to the atmospheric pressure. An intake-air pressure sensor 2 that outputs an electric signal corresponding to an intake-air pressure Pa, which is the pressure of intake air (the atmospheric air, in this example), is provided outside the intake path 23 (for example, inside the controller 50).

Each of the intake-air temperature sensor 4 and the intake-air humidity sensor 5 may be either integrated with or separated from the air flow sensor 3. Alternatively, each of the intake-air temperature sensor 4 and the intake-air humidity sensor 5 may be provided outside the intake path 23, as is the case with the intake-air pressure sensor 2; the intake-air pressure sensor 2 may be provided at a place the same as the place where the intake-air temperature sensor 4 and the intake-air humidity sensor 5 are provided. In any case, the intake-air pressure sensor 2, the intake-air temperature sensor 4, and the intake-air humidity sensor 5 are provided at a place where there exists intake air to be taken into the intake path 23 and the pressure of the intake air is substantially the same.

The portion, at the downstream side of the throttle valve 6, of the intake path 23 is an intake manifold 12. The upstream portion of the intake manifold 12 is a surge tank 11 for suppressing an intake-air ripple. The internal combustion engine 1 has an EGR path 21 for recirculating exhaust gas from the exhaust path 17 to the intake manifold 12 (the surge tank 11, in this example) and an EGR valve 22 for opening and closing the EGR path 21. The EGR valve 22 is an electronically controlled EGR valve that is opening/closing-driven by an electric actuator such as an electric motor to be controlled by the controller 50. Exhaust gas (referred to as recirculation exhaust gas, hereinafter) that is recirculated to the surge tank 11 and intake air that is taken into the surge tank 11 are mixed and homogenized in the surge tank 11. "EGR" is an acronym for Exhaust Gas Recirculation.

In the intake manifold 12, there are provided a manifold pressure sensor 8 that outputs an electric signal corresponding to a manifold pressure Pb, which is the pressure of gas in the intake manifold 12, a manifold temperature sensor 9 that outputs an electric signal corresponding to a manifold temperature Tb, which is the temperature of gas in the intake manifold 12, and a manifold humidity sensor 10 that outputs an electric signal corresponding to a manifold humidity Hrb, which is the humidity of gas in the intake manifold 12. Each of the manifold temperature sensor 9 and the manifold humidity sensor 10 may be either integrated with or separated from the manifold pressure sensor 8. The manifold temperature sensor 9 and the manifold humidity sensor 10 are provided at the downstream side of the connection point between the intake manifold 12 and the EGR path 21 so that the temperature and the humidity of a gas obtained by sufficiently mixing intake air with recirculation exhaust gas can be detected.

An injector 13 for injecting a fuel is provided at the downstream side of the intake manifold 12. The injector 13 may be provided in such a way as to inject a fuel directly into the cylinder 25.

An ignition plug for igniting a fuel-air mixture and an ignition coil 16 for supplying ignition energy to the ignition plug are provided on the top of the cylinder 25. On the top of the cylinder 25, there are provided an intake valve 14 for adjusting the amount of intake air to be taken from the intake path 23 into the cylinder 25 and an exhaust valve 15 for adjusting the amount of exhaust gas to be exhausted from the cylinder to the exhaust path 17. The intake valve 14 is provided with an intake-air variable valve timing mechanism that makes the opening/closing timing therefor variable. The exhaust valve 15 is provided with an exhaust-gas variable valve timing mechanism that makes the opening/closing timing therefor variable.

Each of the variable valve timing mechanisms 14 and 15 has an electric actuator. On the crankshaft of the internal combustion engine 1, there is provided a crank angle sensor 20 for generating an electric signal corresponding to the rotation angle thereof.

In the exhaust path 17, there is provided an air-fuel ratio sensor 18 for detecting an air-fuel (Air/Fuel) ratio AF, which is the ratio of air to fuel in exhaust gas. A catalyst 19 for purifying exhaust gas is also provided in the exhaust path 17. As the catalyst 19, a three-way catalyst, the purification performance of which becomes higher in the vicinity of the theoretical air-fuel ratio AF0, is utilized.

1-2. The Configuration of the Controller 50

Next, the controller 50 will be explained.

Figure 3:
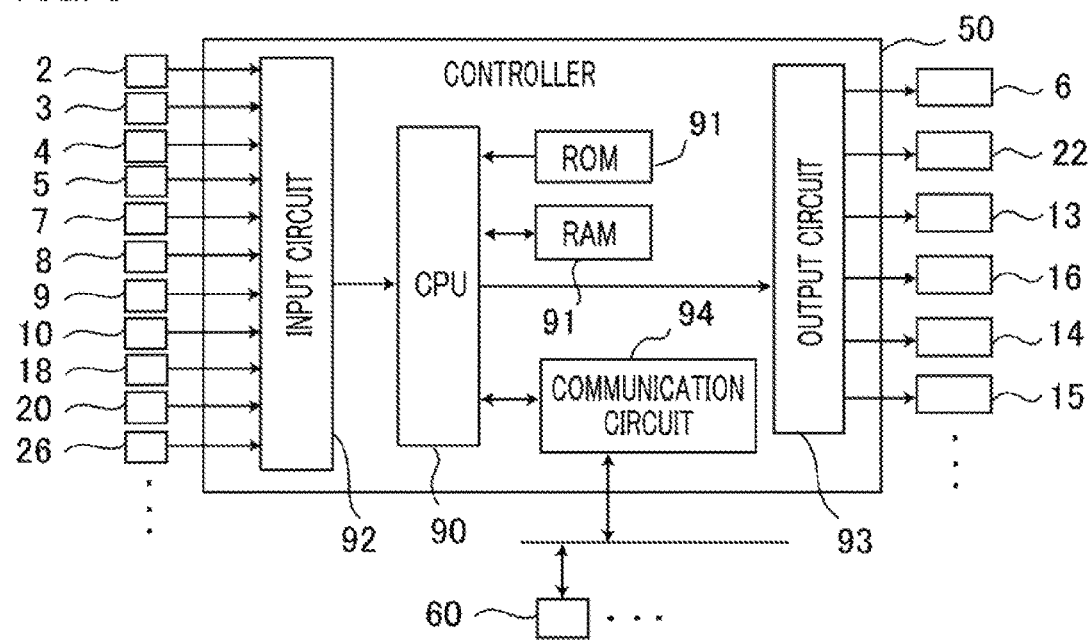
FIG. 3 is a hardware configuration diagram of the controller according to Embodiment 1 of the present invention.

The controller 50 is the one whose control subject is the internal combustion engine 1. As represented in FIG. 2, the controller 50 is provided with control units such as a driving-condition detection unit 51 (corresponding to a driving-condition detector), an inner-manifold water vapor ratio calculation unit 52 (corresponding to an inner-manifold water vapor ratio calculator), an inner-intake-air water vapor ratio calculation unit 53 (corresponding to an inner-intake-air water vapor ratio calculator), an EGR rate calculation unit 54 (corresponding to an EGR rate calculator), and an EGR-rate utilization control unit 55 (corresponding to an EGR-rate-utilization controller). The respective control units 51 through 55 and the like of the controller 50 are realized by processing circuits included in the controller 50. Specifically, as illustrated in FIG. 3, the controller 50 includes, as processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, a communication circuit 94 in which the computing processing unit 90 performs data communication with external apparatuses, and the like.

As the storage apparatuses 91, there are provided a RAM (Random Access Memory) that can read data from and write data in the computing processing unit 90, a ROM (Read Only Memory) that can read data from the computing processing unit 90, and the like. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for outputting a control signal from the computing processing unit 90. The communication circuit 94 is connected with other vehicle electronic apparatuses such as an air conditioner controller 60 and the like through a communication wire and performs cable communication based on a communication protocol such as the CAN (Controller Area Network).

In addition, the computing processing unit 90 runs software items (programs) stored in the storage apparatus 91 such as a ROM and collaborates with other hardware devices in the controller 50, such as the storage apparatus 91, the input circuit 92, the output circuit 93, and the communication circuit 94, so that the respective functions of the control units 51 through 55 included in the controller 50 are realized. Setting data items such as tables and determination values to be utilized in the control units 51 through 55 are stored, as part of software items (programs), in the storage apparatus 91 such as a ROM.

In Embodiment 1, the input circuit 92 is connected with the intake-air pressure sensor 2, the air flow sensor 3, the intake-air temperature sensor 4, the intake-air humidity sensor 5, the throttle opening degree sensor 7, the manifold pressure sensor 8, the manifold temperature sensor 9, the manifold humidity sensor 10, the air-fuel ratio sensor 18, the crank angle sensor 20, an accelerator position sensor 26, and the like. The output circuit 93 is connected with the throttle valve 6 (electric motor), the EGR valve 22 (electric actuator), the injector 13, the ignition coil 16, the intake-air variable valve timing mechanism 14, the exhaust-gas variable valve timing mechanism 15, and the like. The controller 50 is connected with various kinds of unillustrated sensors, switches, actuators, and the like.

As basic control, the controller 50 calculates the fuel injection amount, the ignition timing, and the like, based on inputted output signals and the like from the various kinds of sensors, and then performs driving control of the injector 13, the ignition coil 16, and the like. Based on the output signal of the accelerator position sensor 26 and the like, the controller 50 calculates the output torque of the internal combustion engine 1, demanded by the driver, and then controls the throttle valve 6 and the like so that an intake air amount for realizing the demanded output torque is obtained. Specifically, the controller 50 calculates a target throttle opening degree and then performs driving control of the electric motor for the throttle valve 6 so that the throttle opening degree, detected based on the output signal of the throttle opening degree sensor 7, approaches the target throttle opening degree.

1-2-1. The EGR-Rate-Utilization Control Unit 55

Based on an EGR rate Regr calculated by the EGR rate calculation unit 54, the EGR-rate-utilization control unit 55 changes one of or both of the ignition timing and the opening degree of the EGR valve 22. For example, the EGR-rate-utilization control unit 55 calculates the ignition timing, based on the rotation speed of the internal combustion engine 1, the charging efficiency, and the EGR rate Regr. Based on the driving condition such as the rotation speed of the internal combustion engine 1, the charging efficiency, and the like, the EGR-rate utilization control unit 55 calculates a target EGR rate, and then increases or decreases the opening degree of the EGR valve 22 so that the EGR rate Regr approaches the target EGR rate. Because each of the accuracy of ignition-timing setting and the accuracy of EGR-rate control provides a large effect to the accuracy of controlling the combustion condition of the internal combustion engine 1, the output torque, the thermal efficiency, the NOx generation amount, and the like, the estimation accuracy for the EGR rate Regr is important in controlling the internal combustion engine 1.

1-2-2. Theoretical Derivation of the Calculation Method for the EGR Rate Rear

At first, theoretical derivation of a calculation method for the EGR rate Regr will be explained.

The EGR rate Regr is the ratio of the exhaust gas (recirculation exhaust gas) recirculated into the intake manifold 12 to the gas in the intake manifold 12. By use of the equation (1), the EGR rate Regr can be calculated based on the $CO_2$ concentration.

$$Regr = \frac{CO_{2\_in} - CO_{2\_a}}{CO_{2\_ex} - CO_{2\_a}} \quad (1)$$

where $CO_{2\_in}$ is the concentration [vol %] of $CO_2$ in the gas inside the intake manifold 12; $CO_{2\_ex}$ is the concentration [vol %] of $CO_2$ in the exhaust gas inside the exhaust path 17; $CO_{2\_a}$ is the concentration [vol %] of $CO_2$ in the intake air. In general, the concentration of $CO_2$ in the intake air (the atmospheric air) is approximately 0.038 [vol %].

Hereinafter, by paying attention to the respective numbers of moles of molecules in a combustion chemical reaction formula and the partial pressures of gases, a relational equation among the respective numbers of moles of molecules, the partial pressures, the $CO_2$ concentration, and the ECR rate Regr will be derived.

The combustion chemical reaction formula for a hydrocarbon at a time when the fuel of the internal combustion engine 1 is gasoline, for example, is expressed by the equation (2).

$$C_nH_m + \left(n + \frac{m}{4}\right) \cdot O_2 \rightarrow n \cdot CO_2 + \frac{m}{2} \cdot H_2O \quad (2)$$

In the case where when it is assumed that the average molecular formula for gasoline is $C_7H_{14}$ and that the composition of air is "oxygen ($O_2$):nitrogen ($N_2$)=21:79", the gasoline and the air combust together at the theoretical air-fuel ratio AF0, the combustion chemical reaction formula is expressed by the equation (3). In the equation (3), the respective numbers of moles of carbon dioxide ($CO_2$) and water vapor ($H_2O$), which are produced by the combustion, are the same, i.e., 14.

$$2.C_7H_{14} + 21.O_2 + 79.N_2 \rightarrow 14.CO_2 + 14.H_2O + 79.N_2 \quad (3)$$

However, actual intake air includes carbon dioxide ($CO_2$) and water vapor ($H_2O$); thus, when it is assumed that the respective numbers of moles of carbon dioxide ($CO_2$) and water vapor ($H_2O$) are $\alpha$ and $\beta$, the combustion chemical reaction formula is expressed by the equation (4). The equation (4) is a pure combustion chemical reaction formula in which no recirculation exhaust gas is taken into consideration.

$$2.C_7H_{14} + 21.O_2 + 79.N_2 + \alpha.CO_2 + \beta.H_2O \rightarrow (14+\alpha) \\ .CO_2 + (14+\beta).H_2O + 79.N_2 \quad (4)$$

In the following analysis of the number of moles, the number of moles of gasoline in the left-hand side of the equation (4) is approximated with "0" because it is small in comparison with the number of total moles. Accordingly, the pre-combustion gas represented in the left-hand side of the equation (4) becomes equal to the intake air. Because the number of total moles of the intake air represented in the left-hand side of the equation (4) is $(100+\alpha+\beta)$ and the number of total moles of the exhaust gas represented in the right-hand side of the equation (4) is $(107+\alpha+\beta)$, the respective numbers of moles at the left-hand side and at the right-hand side are different from each other, strictly speaking; however, in this example, it is assumed that both the respective numbers of total moles at the left-hand side and at the right-hand side are $(M+\alpha+\beta)$.

Figure 4:
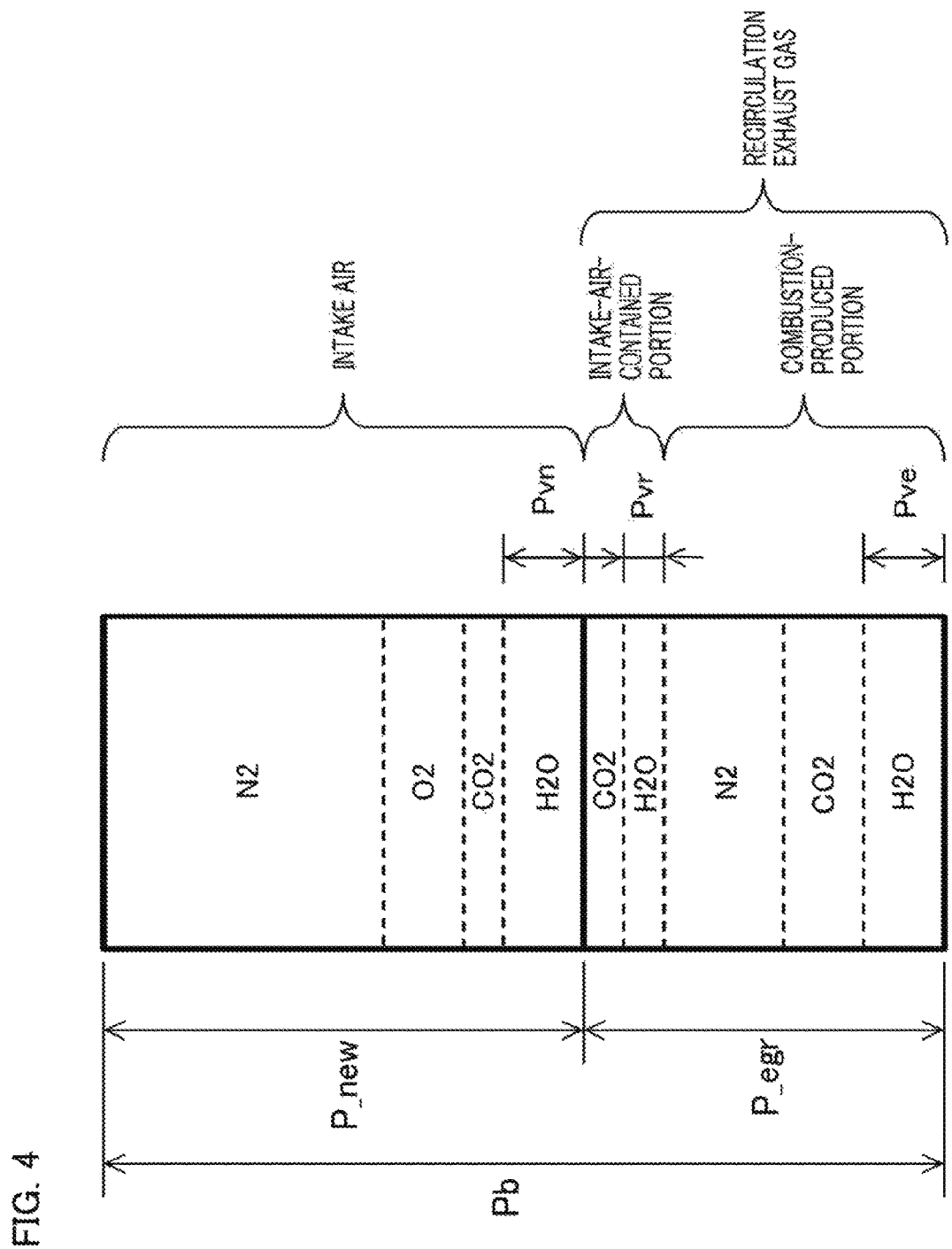
FIG. 4 is a chart representing the state of partial pressures of gasses in the intake manifold according to Embodiment 1 of the present invention.

FIG. 4 represents the state of partial pressures of gasses in the intake manifold 12 at a time when exhaust gas is recirculated to the intake manifold 12. The gas in the intake manifold 12 is a mixture gas including intake air taken from the atmosphere and recirculation exhaust gas recirculated through the EGR path 21; in the manifold pressure, the partial pressure of the intake air is expressed by "P_new" and the partial pressure of the recirculation exhaust gas is expressed by "P_egr".

As represented in the left-hand side of the equation (4), the intake air is composed of nitrogen ($N_2$), oxygen ($O_2$), carbon dioxide ($CO_2$), and water vapor ($H_2O$). Strictly speaking, although included in the intake air, other substances are neglected because their content is extremely small. Pvn denotes the partial pressure of water vapor included in the intake air.

As represented in the right-hand side of the equation (4), the recirculation exhaust gas is composed of nitrogen ($N_2$), carbon dioxide ($CO_2$), and water vapor ($H_2O$). Strictly speaking, although included in the recirculation exhaust gas, other substances are neglected because their content is extremely small. The carbon dioxide ($CO_2$) includes carbon dioxide ($CO_2$) that is produced through combustion and carbon dioxide ($CO_2$) that has originally been included in the intake air; the water vapor ($H_2O$) includes water vapor ($H_2O$) that is produced through combustion and water vapor ($H_2O$) that has originally been included in the intake air. Accordingly, the partial pressure of the water vapor produced through combustion is expressed by Pve, and the partial pressure of the water vapor that has originally been included in the intake air is expressed by Pvr.

When the respective $CO_2$ concentrations in the equation (1) for calculating the EGR rate Regr are expressed by the respective ratios of the partial pressure P_new of the intake air and the partial pressure P_egr of the recirculation exhaust gas to the manifold pressure Pb, represented in FIG. 4, and the mole fraction of $CO_2$ in the intake air represented in the left-hand side of the equation (4) or in the exhaust gas represented in the right-hand side of the equation (4), the equation (5) is yielded. Specifically, as represented in FIG. 4, the concentration $CO_2$ in of $CO_2$ in the gas inside the intake manifold 12 is the total of the concentration of $CO_2$ in the intake air inside the intake manifold 12, and the concentration of $CO_2$ produced through combustion and $CO_2$ contained in the intake air which are included in the recirculation exhaust gas. The concentration of $CO_2$ in the intake air inside the intake manifold 12 is obtained by multiplying the ratio (P_new/Pb) of the partial pressure P_new of the intake air to the manifold pressure Pb by the mole fraction ($\alpha/(M+\alpha-\beta)$) of $CO_2$ contained in the intake air, represented in the left-hand side of the equation (4). The concentration of $CO_2$ produced through combustion and $CO_2$ in the intake air that are included in the recirculation exhaust gas is obtained by multiplying the ratio (P_eqr/Pb) of the partial pressure P_eqr of the recirculation exhaust gas to the manifold pressure Pb by the mole fraction (($14+\alpha$)/($M+\alpha+\beta$)) of $CO_2$ in the exhaust gas, represented in the right-hand side of the equation (4). The concentration $CO_2$ ex of $CO_2$ in the exhaust gas is the mole fraction (($14+\alpha$)/($M+\alpha+\beta$)) of $CO_2$ in the exhaust gas, represented in the right-hand side of the equation (4). The concentration $CO_2$ a of $CO_2$ in the intake air is the mole fraction ($\alpha/(M+\alpha+\beta)$) of $CO_2$ in the intake air, represented in the left-hand side of the equation (4)

$$CO_{2\_in} = \frac{P\_new}{Pb} \cdot \frac{\alpha}{M+\alpha+\beta} + \frac{P\_egr}{Pb} \cdot \frac{14+\alpha}{M+\alpha+\beta} \quad (5)$$

$$CO_{2\_ex} = \frac{14+\alpha}{M+\alpha+\beta}$$

$$CO_{2\_a} = \frac{\alpha}{M+\alpha+\beta}$$

When the respective concentrations of $CO_2$ in the equation (5) are substituted for the equation (1) and the equation (1) is rearranged, the EGR rate Regr is given by the ratio (P_egr/Pb) of the partial pressure P_egr of the recirculation exhaust gas to the manifold pressure Pb, as represented in the equation (6).

$$Regr = \frac{CO_{2\_in} - CO_{2\_a}}{CO_{2\_ex} - CO_{2\_a}} = \quad (6)$$

$$\frac{\left(\frac{P\_new}{Pb} \cdot \frac{\alpha}{M+\alpha+\beta} + \frac{P\_egr}{Pb} \cdot \frac{14+\alpha}{M+\alpha+\beta}\right) - \left(\frac{\alpha}{M+\alpha+\beta}\right)}{\left(\frac{14+\alpha}{M+\alpha+\beta}\right) - \left(\frac{\alpha}{M+\alpha+\beta}\right)} =$$

$$\frac{P\_egr}{Pb}$$

Next, a relational equation will be derived by paying attention to the mole fractions of the water vapor in the gases.

By use of the mole fraction ($\beta/(M+\alpha+\beta)$) of water vapor in the intake air represented in the left-hand side of the equation (4), the mole fraction $\chi va$ of the water vapor in the intake air can be expressed as in the equation (7).

$$\chi va = \frac{\beta}{M+\alpha+\beta} \quad (7)$$

As represented in FIG. 4 or in the equation (8), the mole fraction $\chi vb$ of the water vapor in the gas inside the intake manifold 12 is the total of the mole fraction (the first item in the right-hand side of the equation (8)) of the water vapor included in the intake air inside the intake manifold 12 and the mole fraction (the second item in the right-hand side of the equation (8)) of the water vapor produced through combustion and the water vapor contained in the intake air, which are included in the recirculation exhaust gas. As represented in the first item of the right-hand side of the equation (8), the mole fraction of the water vapor included in the intake air inside the intake manifold 12 is obtained by multiplying the ratio (P_new/Pb) of the partial pressure P_new of the intake air to the manifold pressure Pb by the mole fraction ($\beta/M+\alpha+\beta$) of the water vapor in the intake air, represented in the left-hand side of the equation (4). As represented in the second item of the right-hand side of the equation (8), the mole fraction of the water vapor produced through combustion and the water vapor contained in the intake air, which are included in the recirculation exhaust gas, is obtained by multiplying the ratio (P_eqr/Pb) of the partial pressure P_egr of the recirculation exhaust gas to the manifold pressure Pb by the mole fraction (($14+\beta$/($M+\alpha+\beta$)) of the water vapor in the exhaust gas, represented in the right-hand side of the equation (4). Accordingly, the mole fraction $\chi vb$ of the water vapor in the intake manifold 12 can be expressed as in the equation (8), by use of these mole fractions of water vapor.

$$\chi vb = \frac{P\_new}{Pb} \cdot \frac{\beta}{M+\alpha+\beta} + \frac{P\_egr}{Pb} \cdot \frac{14+\beta}{M+\alpha+\beta} \quad (8)$$

$$= \frac{\beta}{M+\alpha+\beta} + \frac{P\_egr}{Pb} \cdot \frac{14}{M+\alpha+\beta}$$

The rearranged first item ($\beta/(M+\alpha+\beta)$) of the right-hand side of the equation (8) is equal to the mole fraction $\chi va$ of the water vapor in the intake air, represented in the equation (7); thus, when the equation (7) is substituted for the equation (8) and then the equation (8) is rearranged, the equation (9) is obtained. As represented in the equation (9), the subtraction mole fraction ($\chi vb - \chi va$) obtained by subtracting the mole fraction $\chi va$ of the water vapor in the intake air from the mole fraction $\chi vb$ of the water vapor in the intake manifold 12 is equal to the value obtained by multiplying the ratio (P_egr/Pb) of the partial pressure P_egr of the recirculation exhaust gas to the manifold pressure Pb by the mole fraction $\chi vex$ (=$14/(M+\alpha+\beta)$) of inner-exhaust-gas combustion-produced water vapor, which is the mole fraction of water vapor produced through combustion in the exhaust gas, obtained from the right-hand side of the equation (4). The subtraction mole fraction ($\chi vb - \chi va$) becomes equal to the mole fraction $\chi vegr$ of the water vapor, produced through combustion, in the recirculation exhaust gas (referred to as the mole fraction $\chi vegr$ of combustion-produced water vapor in the intake manifold 12). Thus, the equation (9) suggests that the mole fraction $\chi vegr$ of combustion-produced water vapor in the intake manifold 12 is equal to a multiplication value obtained by multiplying the ratio (P_egr/Pb) of the partial pressure P_egr of the recirculation exhaust gas to the manifold pressure Pb by the mole fraction $\chi vex$ inner-exhaust-gas combustion-produced water vapor.

$$\chi vb - \chi va = \frac{P\_egr}{Pb} \cdot \chi vex \quad (9)$$

$$\chi vex = \frac{14}{M + \alpha + \beta}$$

$$\chi vegr = \chi vb - \chi va$$

From the derivation result of the equation (5), (P_egr/Pb) in the equation (9) is equal to the EGR rate Regr; thus, when the equation (5) is substituted for the equation (9) and then the equation (9) is rearranged, the equation (10) is obtained. Accordingly, the EGR rate Regr becomes a value obtained by dividing the mole fraction $\chi vegr$ of combustion-produced water vapor in the intake manifold 12, calculated by subtracting the mole fraction $\chi va$ of the water vapor in the intake air from the mole fraction $\chi vb$ of the water vapor in the intake manifold 12, by the mole fraction $\chi vex$ of inner-exhaust-gas combustion-produced water vapor. In other words, it is suggested that by dividing the mole fraction $\chi vegr$ of combustion-produced water vapor in the intake manifold 12 by the mole fraction $\chi vex$ of inner-exhaust-gas combustion-produced water vapor, the total mole fraction of all the recirculation exhaust gas in the gas inside the intake manifold 12 is obtained and that the mole fraction of the recirculation exhaust gas is equal to the ratio (P_egr/Pb) of the partial pressure P_egr of the recirculation exhaust gas to the manifold pressure Pb, i.e., the recirculation exhaust gas.

$$Regr = (\chi vb - \chi va) \cdot \frac{1}{\chi vex} \quad (10)$$

$$\chi vex = \frac{14}{M + \alpha + \beta}$$

$$\chi vegr = \chi vb - \chi va$$

By rearranging the equation (7) with respect to β, the number β of moles of water vapor in the intake air can be expressed by the equation (11).

$$\beta = \frac{\chi va}{1 - \chi va} \cdot (M + \alpha) \quad (11)$$

By substituting the equation (11) for the equation (10) and then rearranging the equation (10), the equation (12) is obtained. In the equation (12), the number a of moles of $CO_2$ in the intake air is set to 0.038, which is a nominal value.

$$Regr = (\chi vb - \chi va) \cdot \frac{1}{\chi vex} \quad (12)$$

$$\chi vex = \frac{14}{M + \alpha + \frac{\chi va}{1 - \chi va} \cdot (M + \alpha)} \cdot (1 - \chi va) =$$

$$\frac{14}{M + \alpha} \cdot (1 - \chi va) = \frac{14}{107 + 0.038} \cdot (1 - \chi va)$$

Thus, it is conceivable that from the derivation result of the equation (12), the ECR rate Regr can be calculated based on the mole fraction $\chi vb$ of water vapor in the intake manifold 12 and the mole fraction $\chi va$ of water vapor in intake air.

As represented in the equation (13), the mole fraction $\chi vb$ of water vapor in the intake manifold 12 becomes theoretically equal to the ratio (Pvb/Pb) of the partial pressure Pvb of inner-manifold water vapor, which is the partial pressure of water vapor included in the gas inside the intake manifold 12, to the manifold pressure Pb. The mole fraction $\chi va$ of water vapor in the intake air becomes theoretically equal to the ratio (Pva/Pa) of the partial pressure Pva of inner-intake-air water vapor, which is the partial pressure of water vapor included in the intake air, to the intake-air pressure Pa.

$$\chi vb = \frac{Pvb}{Pb} \quad (13)$$

$$\chi va = \frac{Pva}{Pa}$$

Thus, it is conceivable that as represented in the equation (14) obtained by substituting the equation (13) for the equation (12), the EGR rate Regr can be calculated by detecting the inner-manifold water vapor partial pressure ratio (Pvb/Pb), which is the ratio of the partial pressure Pvb of the inner-manifold water vapor to the manifold pressure Pb, and the inner-intake-air water vapor partial pressure ratio (Pva/Pa), which is the ratio of the partial pressure Pva of the inner-intake-air water vapor to the intake-air pressure Pa.

$$Regr = \left(\frac{Pvb}{Pb} - \frac{Pva}{Pa}\right) \cdot \frac{M + \alpha}{14} \cdot \frac{1}{1 - \frac{Pva}{Pa}} \quad (14)$$

1-2-3. The Configuration of the Controller 50 for Calculating the EGR Rate Regr Accordingly, as represented in FIG. 2, the controller 50 according to Embodiment 1 is provided with the driving-condition detection unit 51, the inner-manifold water vapor ratio calculation unit 52, the inner-intake-air water vapor ratio calculation unit 53, and the EGR rate calculation unit 54. The driving-condition detection unit 51 detects the manifold pressure Pb, which is the pressure of gas in the intake manifold 12, the manifold temperature Tb, which is the temperature of gas in the intake manifold 12, the manifold humidity Hrb, which is the humidity of gas in the intake manifold 12, the intake-air pressure Pa, which is the pressure of intake air to be taken into the intake path 23, the intake-air temperature Ta, which is the temperature of intake air, and the intake-air humidity Hra, which is the humidity of intake air.

Eased on the manifold humidity Hrb and the manifold temperature Tb, the inner-manifold water vapor ratio calculation unit 52 calculates the partial pressure Pvb of the inner-manifold water vapor, which is the partial pressure of water vapor included in the gas inside the intake manifold 12, so as to calculate the inner-manifold water vapor partial pressure ratio (Pvb/Pb), which is the ratio of the partial pressure Pvb of the inner-manifold water vapor to the manifold pressure Pb. Based on the intake-air humidity Hra and the intake-air temperature Ta, the inner-intake-air water vapor ratio calculation unit 53 calculates the partial pressure Pva of inner-intake-air water vapor, which is the partial pressure of water vapor included in the intake air, so as to calculate the inner-intake-air water vapor partial pressure ratio (Pva/Pa), which is the ratio of the partial pressure Pva of the inner-intake-air water vapor to the intake-air pressure Pa.

Then, based on the inner-manifold water vapor partial pressure ratio (Pvb/Pb) and the inner-intake-air water vapor partial pressure ratio (Pva/Pa), the EGR rate calculation unit 54 calculates the EGR rate Regr, which is the ratio of recirculation exhaust gas, recirculated into the intake manifold 12, to the gas in the intake manifold 12.

This configuration makes it possible that based on the detection values of the pressure, the temperature, and the humidity of each of gas and intake air in the intake manifold 12, the inner-manifold water vapor partial pressure ratio (Pvb/Pb) and the inner-intake-air water vapor partial pressure ratio (Pva/Pa) are calculated and that based on these two water vapor partial pressure ratios, the EGR rate Regr is accurately calculated. The details will be explained below.

<The Driving-Condition Detection Unit 51>

The driving-condition detection unit 51 detects the driving conditions of the internal combustion engine 1 and the vehicle. The driving-condition detection unit 51 detects various kinds of driving conditions, based on, for example, the output signals of various kinds of sensors. As described above, the driving-condition detection unit 51 detects the manifold pressure Pb, the manifold temperature Tb, and the manifold humidity Hrb. In Embodiment 1, the driving-condition detection unit 51 detects the manifold pressure Pb, based on the output signal of the manifold pressure sensor 8. The driving-condition detection unit 51 detects the manifold temperature Tb, based on the output signal of the manifold temperature sensor 9. The driving-condition detection unit 51 detects the manifold humidity Hrb, based on the output signal of the manifold humidity sensor 10.

As described above, the driving-condition detection unit 51 detects the intake-air pressure Pa, the intake-air temperature Ta, and the intake-air humidity Hra. In Embodiment 1, the driving-condition detection unit 51 detects the intake-air pressure Pa, based on the output signal of the intake-air pressure sensor 2. The driving-condition detection unit 51 detects the intake-air temperature Ta, based on the output signal of the intake-air temperature sensor 4. The driving-condition detection unit 51 detects the intake-air humidity Hra, based on the output signal of the intake-air humidity sensor 5.

In Embodiment 1, as each of the intake-air humidity sensor 5 and the manifold humidity sensor 10, a sensor of the type that detects a relative humidity is utilized; for example, an electric-resistor sensor that detects a relative humidity based on the electric resistance value of a moisture-sensitive material, an electrostatic-capacitance sensor that detects a relative humidity based on the electrostatic capacitance of a sensor element, or the like is utilized. Accordingly, the driving-condition detection unit 51 detects a relative humidity, as each of the manifold humidity Hrb and the intake-air humidity Hra.

The driving-condition detection unit 51 detects an intake air flow rate, based on the output signal of the air flow sensor 3, detects a throttle opening degree, based on the output signal of the throttle opening degree sensor 7, detects an exhaust gas air-fuel ratio AF, based on the output signal of the air-fuel ratio sensor 18, detects a rotation speed of the internal combustion engine 1, based on the output signal of the crank angle sensor 20, and detects an accelerator opening degree, based on the output signal of the accelerator position sensor 26.

<The Inner-Manifold Water Vapor Ratio Calculation Unit 52>

As described above, based on the manifold humidity Hrb and the manifold temperature Tb, the inner-manifold water vapor ratio calculation unit 52 calculates the partial pressure Pvb of the inner-manifold water vapor, which is the partial pressure of water vapor included in the gas inside the intake manifold 12, so as to calculate the inner-manifold water vapor partial pressure ratio (Pvb/Pb), which is the ratio of the partial pressure Pvb of the inner-manifold water vapor to the manifold pressure Pb.

As described above, the inner-manifold water vapor partial pressure ratio (Pvb/Pb) is theoretically equal to the water vapor mole fraction $\chi vb$, which is the ratio of the number of moles of water vapor to the number of total moles of gas in the intake manifold 12. Therefore, the inner-manifold water vapor partial pressure ratio (Pvb/Pb) can be referred to also as the water vapor mole fraction $\chi vb$.

In Embodiment 1, the inner-manifold water vapor ratio calculation unit 52 calculates a saturated water vapor pressure Psb in the intake manifold 12, based on the manifold temperature Tb, and then calculates the partial pressure Pvb of the inner-manifold water vapor by multiplying the saturated water vapor pressure Psb by the manifold humidity Hrb, which is a relative humidity.

Specifically, the inner-manifold water vapor ratio calculation unit 52 calculates the saturated water vapor pressure Psb in the intake manifold 12 by use of the Tetens equation represented in the equation (15).

$$Psb = 6.1078 \times 10^{\left(\frac{7.5 \times Tb}{Tb+237.3}\right)} \qquad (15)$$

The inner-manifold water vapor ratio calculation unit 52 may calculate the saturated water vapor pressure Psb corresponding to the manifold temperature Tb, by use of a table in which the relationship between the temperature and the saturated water vapor pressure is preliminarily set based on the equation (15).

Then, as represented in the equation (16), the inner-manifold water vapor ratio calculation unit 52 calculates the partial pressure Pvb of the inner-manifold water vapor, by multiplying the saturated water vapor pressure Psb by the manifold humidity Hrb [% RH], and then calculates the inner-manifold water vapor partial pressure ratio (Pvb/Pb), by dividing the partial pressure Pvb of the inner-manifold water vapor by the manifold pressure Pb.

$$Pvb = Psb \cdot \frac{Hrb}{100} \qquad (16)$$

<The Inner-Intake-Air Water Vapor Ratio Calculation Unit 53>

As described above, based on the intake-air humidity Hra and the intake-air temperature Ta, the inner-intake-air water vapor ratio calculation unit calculates the partial pressure Pva of inner-intake-air water vapor, which is the partial pressure of water vapor included in the intake air, so as to calculate the inner-intake-air water vapor partial pressure ratio (Pva/Pa), which is the ratio of the partial pressure Pva of the inner-intake-air water vapor to the intake-air pressure Pa.

As described above, the inner-intake-air water vapor partial pressure ratio (Pva/Pa) is theoretically equal to the water vapor mole fraction $\chi$va, which is the ratio of the number of moles of water vapor to the number of total moles of intake air. Thus, the inner-intake-air water vapor partial pressure ratio (Pva/Pa) can be referred to also as the inner-intake-air water vapor mole fraction $\chi$va.

In Embodiment 1, based on the intake-air temperature Ta, the inner-intake-air water vapor ratio calculation unit 53 calculates a saturated water vapor pressure Psa of intake air and then calculates the inner-intake-air water vapor partial pressure Pva by multiplying the saturated water vapor pressure Psa by the intake-air humidity Hra, which is a relative humidity.

Specifically, the inner-intake-air water vapor ratio calculation unit 53 calculates the saturated water vapor pressure Psa of the intake air by use of the Tetens equation represented in the equation (17).

$$Psa = 6.1078 \times 10^{\left(\frac{7.5 \times Ta}{Ta + 237.3}\right)} \quad (17)$$

The inner-intake-air water vapor ratio calculation unit 53 may calculate the saturated water vapor pressure Psa corresponding to the intake-air temperature Ta by use of a table in which the relationship between the temperature and the saturated water vapor pressure is preliminarily set.

Then, as represented in the equation (18), the inner-intake-air water vapor ratio calculation unit 53 calculates the inner-intake-air water vapor partial pressure Pva by multiplying the saturated water vapor pressure Psa by the intake-air humidity Hra [% RH], and then calculates the inner-intake-air water vapor partial pressure ratio (Pva/Pa), by dividing the partial pressure Pva of the inner-intake-air water vapor by the intake-air pressure Pa.

$$Pva = Psa \cdot \frac{Hra}{100} \quad (18)$$

<The ECR Rate Calculation Unit 54>

As described above, based on the inner-manifold water vapor partial pressure ratio (Pvb/Pb) and the inner-intake-air water vapor partial pressure ratio (Pva/Pa), the EGR rate calculation unit 54 calculates the EGR rate Regr, which is the ratio of recirculation exhaust gas, recirculated into the intake manifold 12, to the gas in the intake manifold 12.

The EGR rate calculation unit 54 calculates the EGR rate Rear by use of the equation (19) based on the equation (14) above. In other words, the EGR rate calculation unit 54 calculates a subtraction partial pressure ratio by subtracting the inner-intake-air water vapor partial pressure ratio (Pva/Pa) from the inner-manifold water vapor partial pressure ratio (Pvb/Pb), multiplies the subtraction partial pressure ratio by a preliminarily set conversion constant Kr, then calculates, as the EGR rate Regr, a value by dividing the multiplication value by a subtraction value obtained by subtracting the inner-intake-air water vapor partial pressure ratio (Pva/Pa) from "1".

$$Regr = \left(\frac{Pvb}{Pb} - \frac{Pva}{Pa}\right) \cdot Kr \cdot \frac{1}{1 - \frac{Pva}{Pa}} \quad (19)$$

$$Kr = \frac{M + \alpha}{14} = \frac{107 + 0.038}{14}$$

Based on the respective numbers of moles of molecules in the chemical reaction formula at a time when a fuel and wet air combust together, the conversion constant Kr is preliminarily set as represented in the equation (19). Specifically, the conversion constant Kr is preliminarily set to a fixed value obtained by dividing a value (107+0.038, in this example), calculated by subtracting the number $\beta$ of moles of inner-intake-air water vapor from the number (M+$\alpha$+$\beta$) of total moles of exhaust gas in the right-hand side (combusted gas) of the combustion chemical reaction formula represented in the equation (4), by the number of moles of the combustion-produced water vapor (14, in this example). The conversion constant Kr may be a value other than the value represented in the equation (19), for example, a value obtained through adjustment based on an experimental value. Because sufficiently smaller than M, the number $\alpha$ of moles of inner-intake-air carbon dioxide may be regarded as zero.

The calculation by the equation (19) will be expressed based on physical quantities. The equation (20) is obtained by modifying the equation (19). As represented in the equation (20), the EGR rate calculation unit 54 calculates an inner-manifold combustion-produced water vapor partial pressure ratio (Pvegr/Pb), which is the ratio of the partial pressure Pvegr (referred to as an inner-intake-manifold combustion-produced water vapor partial pressure Pvegr) of combustion-produced water vapor included in recirculation exhaust gas to the manifold pressure Pb, by subtracting the inner-intake-air water vapor partial pressure ratio (Pva/Pa) from the inner-manifold water vapor partial pressure ratio (Pvb/Pb). Based on the number of moles of molecules in the chemical reaction formula at a time when a fuel and wet air combust together and the inner-intake-air water vapor partial pressure ratio (Pva/Pa), the EGR rate calculation unit 54 calculates the inner-exhaust-gas combustion-produced water vapor mole fraction $\chi$vex, which is the mole fraction of combustion-produced water vapor in exhaust gas. Then, the EGR rate calculation unit 54 calculates, as the EGR rate Regr, a value by dividing the inner-manifold combustion-produced water vapor partial pressure ratio (Pvegr/Pb) by the inner-exhaust-gas combustion-produced water vapor mole fraction $\chi$vex.

$$Regr = \frac{Pvegr}{Pb} \cdot \frac{1}{\chi vex} \quad (20)$$

$$\frac{Pvegr}{Pb} = \frac{Pvb}{Pb} - \frac{Pva}{Pa}$$

$$\chi vex = Kr2 \cdot \left(1 - \frac{Pva}{Pa}\right)$$

$$Kr2 = \frac{14}{M + \alpha} = \frac{14}{107 + 0.038}$$

Speaking in detail, the EGR rate calculation unit 54 calculates, as the inner-exhaust-gas combustion-produced water vapor mole fraction χvex, a value by multiplying a preliminarily set mole conversion constant Kr2 by a subtraction value calculated by subtracting the inner-intake-air water vapor partial pressure ratio (Pva/Pa) from "1". As is the case with the foregoing conversion constant Kr, the mole conversion constant Kr2 is preliminarily set based on an experimental value, the respective numbers of moles of molecules in the chemical reaction formula at a time when a fuel and wet air combust together, or the like. The calculation equation for the inner-exhaust-gas combustion-produced water vapor mole fraction χvex is derived by substituting the equation. (11), derived based on the combustion chemical reaction formula represented in the equation (4), for the equation (10), derived based on the combustion chemical reaction formula represented in the equation (4).

As described above, by dividing the inner-manifold combustion-produced water vapor partial pressure ratio (Pvegr/Pb) by the inner-exhaust-gas combustion-produced water vapor mole fraction χvex, the ratio (P_egr/Pb) of the partial pressure P_egr of recirculation exhaust gas to the manifold pressure Pb is obtained and hence the ECR rate Regr is obtained.

1-2-4. Flowchart.

Figure 5:
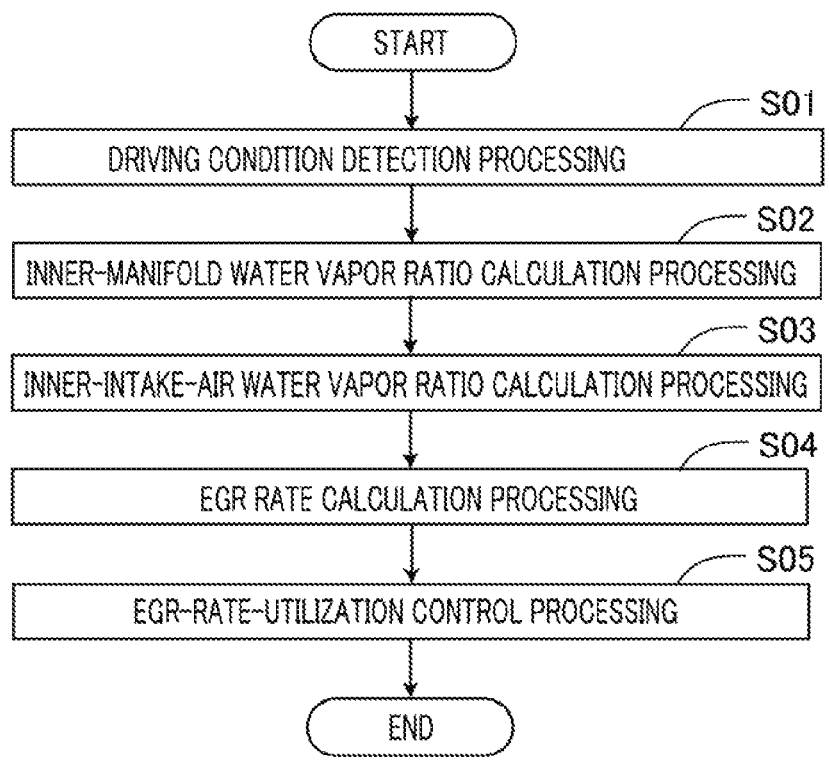
FIG. 5 is a flowchart representing the processing by the controller according to Embodiment 1 of the present invention.

The procedure (the control method for the internal combustion engine 1) of the processing by the controller 50 according to Embodiment 1 will be explained based on the flowchart represented in FIG. 5. The processing represented in the flowchart in FIG. 5 is recurrently implemented, for example, every constant operation cycle while the computing processing unit 90 implements software (a program) stored in the storage apparatus 91.

In the step S01, the driving-condition detection unit 51 implements driving condition detection processing (a driving condition detection step, a driving-condition detecting) for, as mentioned above, detecting the driving condition of the internal combustion engine 1. The driving-condition detection unit 51 detects the manifold pressure Pb, the manifold temperature Tb, the manifold humidity Hrb, the intake-air pressure Pa, the intake-air temperature Ta, the intake-air humidity Hra, and the like.

Next, in the step S02, the inner-manifold water vapor ratio calculation unit 52 implements inner-manifold water vapor ratio calculation processing (an inner-manifold water vapor ratio calculation step, an inner-manifold water vapor ratio calculating) in which as described above, based on the manifold humidity Hrb and the manifold temperature Tb, the inner-manifold water vapor ratio calculation unit 52 calculates the inner-manifold water vapor partial pressure Pvb so as to calculate the inner-manifold water vapor partial pressure ratio (Pvb/Pb), which is the ratio of the inner-manifold water vapor partial pressure Pvb to the manifold pressure Pb.

In the step S03, the inner-intake-air water vapor ratio calculation unit 53 implements inner-intake-air water vapor ratio calculation processing (an inner-intake-air water vapor ratio calculation step, an inner-intake-air water vapor ratio calculating) in which as described above, based on the intake-air humidity Hra and the intake-air temperature Ta, the inner-intake-air water vapor ratio calculation unit 53 calculates the inner-intake-air water vapor partial pressure Pva so as to calculate the inner-intake-air water vapor partial pressure ratio (Pva/Pa), which is the ratio of the inner-intake-air water vapor partial pressure Pva to the intake-air pressure Pa.

In the step S04, the EGR rate calculation unit 54 implements EGR rate calculation processing (an EGR rate calculation step, an EGR rate calculating) in which as described above, based on the inner-manifold water vapor partial pressure ratio (Pvb/Pb) and the inner-intake-air water vapor partial pressure ratio (Pva/Pa), the EGR rate calculation unit 54 calculates the EGR rate Regr.

Then, in the step S05, the EGR-rate-utilization control unit implements EGR-rate-utilization control processing (an EGR-rate-utilization control step, an EGR-rate-utilization controlling) in which based on the EGR rate Regr, the EGR-rate-utilization control unit 55 changes one of or both of the ignition timing and the opening degree of the EGR valve 22.

2. Embodiment 2

Next, the controller 50 according to Embodiment 2 will be explained. The explanation for constituent parts the same as those in Embodiment 1 will be omitted. The respective basic configurations and processing methods of the internal combustion engine 1 and the controller 50 according to Embodiment 2 are the same as those of the internal combustion engine 1 and the controller 50 according to Embodiment 1; however, Embodiment 2 is different from Embodiment 1 in that the EGR rate Regr is changed in accordance with the air-fuel ratio AF of the internal combustion engine 1.

2-1. Extension of the Calculation Method for the EGR Rate Regr to the Case of Rich- or Lean-Air-Fuel Ratio The calculation method for the EGR rate Regr according to Embodiment 1 is based on the combustion chemical reaction formula represented in the equation (4) at a time when a fuel and wet air combust together at the theoretical air-fuel ratio AF0. Hereinafter, the equation derivation will be extended to the case where the air-fuel ratio of wet air to a fuel is leaner than the theoretical air-fuel ratio AF0 or to the case where the air-fuel ratio is richer that the theoretical air-fuel ratio AF0.

An excess air ratio λ is the ratio of the air-fuel ratio AF to the theoretical air-fuel ratio AF0, as represented in the equation (21). When λ=1, the air-fuel ratio AF is equal to the theoretical air-fuel ratio AF0; when λ<1, the air-fuel ratio AF is rich; when. λ>1, the air-fuel ratio AF is lean.

$$\lambda = \frac{AF}{AF0} \qquad (21)$$

<In the Case of Rich Air-Fuel Ratio>

The equation (22) represents the combustion chemical reaction formula at a time when the air-fuel ratio AF is rich (λ<1).

$$2.C_7H_{14}+\lambda.\{21.O_2+79.N_2+\alpha.CO_2+\beta.H_2O\} \rightarrow \lambda.\{(14+\alpha).CO_2+(14+\beta).H_2O+79.N_2\}+(1-\lambda).2.C_7H_{14} \qquad (22)$$

In this situation, as represented by the last term in the right-hand side of the equation (22), it is assumed that in the case of rich combustion, uncombusted gasoline is directly exhausted with its original molecules. In practice, it is conceivable that due to the combustion temperature in the cylinder 25, uncombusted gasoline is decomposed into methane ($CH_4$), ethane ($C_2H_6$), and the like that each have a molecular weight smaller than that of gasoline; however, because the volume concentration of gasoline is small and the decomposition of gasoline may not provide a substantial effect, the decomposition of gasoline is not taken into consideration in this embodiment.

As represented in the equation (23), the concentration $CO_2$_ex of $CO_2$ in exhaust gas is equal to the ratio (the mole fraction of $CO_2$) of the number of moles of $CO_2$ to the number of total moles in the exhaust gas represented in the right-hand side of the equation (22). Because being small in comparison with the number of total moles, the number $((1-\lambda) \times 2)$ of moles of uncombusted gasoline is approximated with zero. Similarly, the concentration $CO_{2\_in}$ of $CO_2$ in the gas inside the intake manifold 12 and the concentration $CO_{2\_a}$ of $CO_2$ in the intake air are also obtained. From the equation (23), the concentration of $CO_2$ at a time when the air-fuel ratio is rich becomes equal to the concentration of $CO_2$ represented in the equation (5) at a time of the theoretical air-fuel ratio AF0. Therefore, in the case where the air-fuel ratio is rich, the EGR rate Regr becomes the ratio (P_egr/Pb) of the partial pressure P_egr of the recirculation exhaust gas to the manifold pressure Pb, as is the case with the equation (6).

$$CO_{2\_ex} = \tag{23}$$
$$\frac{\lambda \cdot (14+\alpha)}{\lambda \cdot \{M+\alpha+\beta\} + (1-\lambda) \cdot 2} \cong \frac{\lambda \cdot (14+\alpha)}{\lambda \cdot \{M+\alpha+\beta\}} = \frac{14+\alpha}{M+\alpha+\beta}$$

$$CO_{2\_in} = \frac{P\_new}{Pb} \cdot \frac{\lambda \cdot \alpha}{\lambda \cdot \{M+\alpha+\beta\}} + \frac{P\_egr}{Pb} \cdot$$
$$\frac{\lambda \cdot (14+\alpha)}{\lambda \cdot \{M+\alpha+\beta\} + (1-\lambda) \cdot 2}$$
$$\cong \frac{P\_new}{Pb} \cdot \frac{\alpha}{M+\alpha+\beta} + \frac{P\_egr}{Pb} \cdot \frac{14+\alpha}{M+\alpha+\beta}$$

$$CO_{2\_a} = \frac{\lambda \cdot \alpha}{\lambda \cdot \{M+\alpha+\beta\}} = \frac{\alpha}{M+\alpha+\beta}$$

$$\therefore Regr = \frac{P\_egr}{Pb}$$

In the case where the air-fuel ratio is rich, the mole fraction $\chi va$ of water vapor in the intake air and the mole fraction $\chi vb$ of water vapor in the gas in the intake manifold 12 are represented by the equation (24) by use of the mole fraction of water vapor in the left-hand side or the right-hand side of the equation (22) and the like, as is the case with the respective mole fractions at a time of the theoretical air-fuel ratio AF0 represented in the equations (7) and (8).

$$\chi va = \frac{\lambda \cdot \beta}{\lambda \cdot \{M+\alpha+\beta\}} = \frac{\beta}{M+\alpha+\beta} \tag{24}$$

$$\chi vb = \frac{P\_new}{Pb} \cdot \frac{\lambda \cdot \beta}{\lambda \cdot \{M+\alpha+\beta\}} + \frac{P\_egr}{Pb} \cdot \frac{\lambda \cdot (14+\beta)}{\lambda \cdot \{M+\alpha+\beta\} + (1-\lambda) \cdot 2}$$
$$\cong \frac{P\_new}{Pb} \cdot \frac{\beta}{M+\alpha+\beta} + \frac{P\_egr}{Pb} \cdot \frac{14+\beta}{M+\alpha+\beta}$$
$$= \frac{\beta}{M+\alpha+\beta} + \frac{P\_egr}{Pb} \cdot \frac{14}{M+\alpha+\beta}$$

From the equation. (24), the mole fractions $\chi va$ and $\chi vb$ of water vapor at a time when the air-fuel ratio is rich become equal to those represented in the equations (7) and (8), respectively, at a time of the theoretical air-fuel ratio AF0. When at a time of a rich air-fuel ratio ($\lambda<1$), uncombusted gasoline is produced and hence the numerator, i.e., the number of moles of combustion-produced water vapor is obtained by multiplying the number of moles of combustion-produced water vapor at a time of the theoretical air-fuel ratio AF0, i.e., 14 by $\lambda$; however, because the respective numbers of moles of the molecules in the intake air are multiplied by $\lambda$, the denominator, i.e., the number of total moles of exhaust gas is also obtained by multiplying the number of total moles of exhaust gas at a time of the theoretical air-fuel ratio AF0 by $\lambda$. As a result, $\lambda$ in the numerator and $\lambda$ in the denominator cancel each other and hence the respective values the same as those at a time of the theoretical air-fuel ratio AF0 can be obtained. Accordingly, when the air fuel ratio is rich, the ECR rate Regr can be calculated by the equation (14), which is the equation for the case where the air fuel ratio is the theoretical air-fuel ratio AF0.

<In the Case of Lean Air-Fuel Ratio>

The equation (25) represents the combustion chemical reaction formula at a time when the air-fuel ratio AF is lean ($\lambda > 1$).

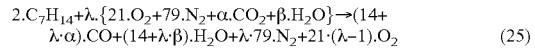

$$2 \cdot C_7H_{14} + \lambda \cdot \{21 \cdot O_2 + 79 \cdot N_2 + \alpha \cdot CO_2 + \beta \cdot H_2O\} \rightarrow (14 + \lambda \cdot \alpha) \cdot CO + (14 + \lambda \cdot \beta) \cdot H_2O + \lambda \cdot 79 \cdot N_2 + 21 \cdot (\lambda - 1) \cdot O_2 \tag{25}$$

As represented in the equation (26), the concentration $CO_{2\_ex}$ of $CO_2$ in exhaust gas is equal to the ratio (the mole fraction of $CO_2$) of the number of moles of $CO_2$ to the number of total moles in the exhaust gas represented in the right-hand side of the equation (25). Because being small in comparison with the number of total moles, the number of moles "7" is approximated with zero. Similarly, the concentration $CO_{2\_in}$ of $CO_2$ in the gas inside the intake manifold 12 and the concentration $CO_{2\_a}$ of $CO_2$ in the intake air are also obtained. From the equation (26), the concentration of $CO_2$ at a time when the air-fuel ratio is lean differs from the concentration of $CO_2$ represented in the equation (5) at a time of the theoretical air-fuel ratio AF0.

$$CO_{2\_ex} = \frac{(14+\lambda \cdot \alpha)}{(14+\lambda \cdot \alpha)+(14+\lambda \cdot \beta)+\lambda \cdot 79+21 \cdot (\lambda-1)} \tag{26}$$
$$= \frac{14+\lambda \cdot \alpha}{\lambda \cdot (M+\alpha+\beta)+7} \cong \frac{14+\lambda \cdot \alpha}{\lambda \cdot (M+\alpha+\beta)}$$

$$CO_{2\_in} = \frac{P\_new}{Pb} \cdot \frac{\lambda \cdot \alpha}{\lambda \cdot \{M+\alpha+\beta\}} + \frac{P\_egr}{Pb} \cdot \frac{14+\lambda \cdot \alpha}{\lambda \cdot (M+\alpha+\beta)+7}$$
$$\cong \frac{P\_new}{Pb} \cdot \frac{\alpha}{M+\alpha+\beta} + \frac{P\_egr}{Pb} \cdot \frac{14+\lambda \cdot \alpha}{\lambda \cdot (M+\alpha+\beta)}$$

$$CO_{2\_a} = \frac{\lambda \cdot \alpha}{\lambda \cdot \{M+\alpha+\beta\}} = \frac{\alpha}{M+\alpha+\beta}$$

Then, by substituting the respective concentrations of $CO_2$ in the equation (26) for the equation (1) and then rearranging the equation (1), the equation (27) is obtained. In the case where the air-fuel ratio is lean, the EGR rate Regr also becomes the ratio (P_egr/Pb) of the partial pressure P_egr of the recirculation exhaust gas to the manifold pressure Pb, as is the case with the equation (6).

$$Regr = \frac{CO_{2\_in} - CO_{2\_a}}{CO_{2\_ex} - CO_{2\_a}} \tag{27}$$
$$= \frac{\left(\frac{P\_new}{Pb} \cdot \frac{\alpha}{M+\alpha+\beta} + \frac{P\_egr}{Pb} \cdot \frac{14+\lambda \cdot \alpha}{\lambda \cdot (M+\alpha+\beta)}\right) - \left(\frac{\alpha}{M+\alpha+\beta}\right)}{\left(\frac{14+\lambda \cdot \alpha}{\lambda \cdot (M+\alpha+\beta)}\right) - \left(\frac{\alpha}{M+\alpha+\beta}\right)}$$
$$= \frac{P\_egr}{Pb}$$

In the case where the air-fuel ratio is lean, the mole fraction χva of water vapor in the intake air and the mole fraction χvb of water vapor in the gas in the intake manifold 12 are represented by the equation (28) by use of the mole fraction of water vapor in the left-hand side or the right-hand side of the equation (25) and the like, as is the case with the respective mole fractions at a time of the theoretical air-fuel ratio AF0 represented in the equations (7) and (8).

$$\chi va = \frac{\lambda \cdot \beta}{\lambda \cdot \{M + \alpha + \beta\}} = \frac{\beta}{M + \alpha + \beta} \quad (28)$$

$$\chi vb = \frac{P\_new}{Pb} \cdot \frac{\lambda \cdot \beta}{\lambda \cdot \{M + \alpha + \beta\}} + \frac{P\_egr}{Pb} \cdot \frac{14 + \lambda \cdot \beta}{\lambda \cdot \{M + \alpha + \beta\} + 7}$$

$$\cong \frac{P\_new}{Pb} \cdot \frac{\beta}{M + \alpha + \beta} + \frac{P\_egr}{Pb} \cdot \frac{14 + \lambda \cdot \beta}{\lambda \cdot \{M + \alpha + \beta\}}$$

$$= \frac{\beta}{M + \alpha + \beta} + \frac{P\_egr}{Pb} \cdot \frac{14}{\lambda \cdot \{M + \alpha + \beta\}}$$

By rearranging the equation (28), as is the case with the equation (9), the equation (29) is obtained. The inner-exhaust-gas combustion-produced water vapor mole fraction χvexL at a time when the air-fuel ratio is lean becomes a value obtained by dividing the inner-exhaust-gas combustion-produced water vapor mole fraction χvex, represented in the equation (9), at a time of the theoretical air-fuel ratio AF0 by the excess air ratio λ. The reason for that is the following: when at a time of a lean air-fuel ratio (λ>1), the fuel completely combusts and hence the numerator, i.e., the number of moles of combustion-produced water vapor is the same as the number of moles of combustion-produced water vapor at a time of the theoretical air-fuel ratio AF0, i.e., 14; in contrast, because the respective numbers of moles of the molecules in the intake air are multiplied by λ, the denominator, i.e., the number of total moles of exhaust gas is obtained by multiplying the number of total moles of exhaust gas at a time of the theoretical air-fuel ratio AF0 by λ.

$$\chi vb - \chi va = \frac{P\_egr}{Pb} \cdot \chi vexL \quad (29)$$

$$\chi vexL = \frac{1}{\lambda} \cdot \frac{14}{M + \alpha + \beta}$$

$$\chi vegr = \chi vb - \chi va$$

By substituting the equation (27) for the equation (29) and then rearranging the equation the equation (30) is obtained.

$$Regr = (\chi vb - \chi va) \cdot \frac{1}{\chi vexL} \quad (30)$$

$$\chi vexL = \frac{1}{\lambda} \cdot \frac{14}{M + \alpha + \beta}$$

$$\chi vegr = \chi vb - \chi va$$

The number β of moles of water vapor in the intake air is given by the equation (11), as is the case with the theoretical air-fuel ratio AF0; thus, by substituting the equation (11) for the equation (30) and rearranging the equation (30), the equation (31) is obtained.

$$Regr = (\chi vb - \chi va) \cdot \frac{1}{\chi vexL} \quad (31)$$

$$\chi vexL =$$

$$\frac{1}{\lambda} \cdot \frac{14}{M + \alpha + \frac{\chi va}{1 - \chi va} \cdot (M + \alpha)} \cdot (1 - \chi va) = \frac{1}{\lambda} \cdot \frac{14}{M + \alpha} \cdot (1 - \chi va)$$

Then, by substituting the equation (13) for the equation (31) and then rearranging the equation (31), the equation (32) is obtained. Therefore, in the case of a lean air-fuel ratio, the EGR rate Regr can be calculated by multiplying the EGR rate Regr, represented in the equation (14), at a time of the theoretical air-fuel ratio AF0 by the excess air ratio λ.

$$Regr = \lambda \cdot \left(\frac{Pvb}{Pb} - \frac{Pva}{Pa}\right) \cdot \frac{M + \alpha}{14} \cdot \frac{1}{1 - \frac{Pva}{Pa}} \quad (32)$$

The foregoing derivation results will be summarized in the equation (33). In the case where the air-fuel ratio AF of the internal combustion engine 1 is the theoretical air-fuel ratio (AF=AF0) or rich (AF<AF0), the EGR rate Regr can be calculated, through the equation (14), based on the inner-manifold water vapor partial pressure ratio (Pvb/Pb) and the inner-intake-air water vapor partial pressure ratio (Pva/Pa). In the case where the air-fuel ratio AF of the internal combustion engine 1 is lean (AF>AF0), the EGR rate Regr can be calculated by, as represented in the equation (32), further multiplying the ECR rate Regr calculated through the equation (14) by the excess air ratio λ.

1) in the case of theoretical air/fuel ratio or rich $$Regr = \left(\frac{Pvb}{Pb} - \frac{Pva}{Pa}\right) \cdot \frac{M + \alpha}{14} \cdot \frac{1}{1 - \frac{Pva}{Pa}} \quad (33)$$

2) in the case of lean $$Regr = \lambda \cdot \left(\frac{Pvb}{Pb} - \frac{Pva}{Pa}\right) \cdot \frac{M + \alpha}{14} \cdot \frac{1}{1 - \frac{Pva}{Pa}}$$

2-2. The Configuration of the EGR Rate Calculation Unit 54

Thus, the EGR rate calculation unit 54 according to Embodiment 2 changes the EGR rate Regr in accordance with the air-fuel ratio AF of the internal combustion engine 1.

As is the case with the equation (19) or (20) in Embodiment 1, the EGR rate calculation unit 54 calculates the EGR rate Regr0 at a time when it is assumed that the air-fuel ratio AF of the internal combustion engine 1 is the theoretical air-fuel ratio, based on the inner-manifold water vapor partial pressure ratio (Pvb/Pb) and the inner-intake-air water vapor partial pressure ratio (Pva/Pa). As represented in the equation (34), in the case where the air-fuel ratio AF is leaner than the theoretical air-fuel ratio AF0, the EGR rate calculation unit 54 calculates, as the final EGR rate Regr, a value by multiplying the EGR rate Regr0 at a time when it is assumed that the air-fuel ratio is the theoretical air-fuel ratio AF0 by the excess air ratio λ obtained by dividing the air-fuel ratio AF by the theoretical air-fuel ratio AF0. On the other hand, in the case where the air-fuel ratio AF is richer than the theoretical air-fuel ratio AF0, the EGR rate calculation unit 54 directly calculates, as the final EGR rate Regr, the EGR rate Regr0 at a time when it is assumed that the air-fuel ratio is the theoretical air-fuel ratio AF0.

1) in the case of lean

Regr=λ·Regr0

$$\lambda = AF/AF0 \quad (34)$$

2) in the case of theoretical air/fuel ratio or rich

Regr=Regr0

Expression will be made based on physical quantities. As represented in the equation (35), the EGR rate calculation unit 54 calculates, as is the case with the equation (20) in Embodiment 1 the inner-exhaust-gas combustion-produced water vapor mole fraction) $\chi vex0$ at a time when it is assumed that the air-fuel ratio AF of the internal combustion engine 1 is the theoretical air-fuel ratio, based on the respective numbers of moles of molecules in the chemical reaction formula at a time when the fuel and wet air combust together at the theoretical air-fuel ratio AF0 and the inner-intake-air water vapor partial pressure ratio (Pva/Pa). The EGR rate calculation unit 54 calculates the inner-manifold combustion-produced water vapor partial pressure ratio (Pvegr/Pb) by subtracting the inner-intake-air water vapor partial pressure ratio (Pva/Pa) from the inner-manifold water vapor partial pressure ratio (Pvb/Pb).

$$\chi vex0 = Kr2 \cdot \left(1 - \frac{Pva}{Pa}\right), Kr2 = \frac{14}{M+\alpha} = \frac{14}{107+0.038} \quad (35)$$

$$\frac{Pvegr}{Pb} = \frac{Pvb}{Pb} - \frac{Pva}{Pa}$$

As represented in the equation (36), in the case where the air-fuel ratio AF is leaner than the theoretical air-fuel ratio AF0, the EGR rate calculation unit 54 calculates, as the inner-exhaust-gas combustion-produced water vapor mole fraction $\chi vexL$ at a time of a lean air-fuel ratio, a value by dividing the inner-exhaust-gas combustion-produced water vapor mole fraction $\chi vex0$ at a time when it is assumed that the air-fuel ratio is the theoretical air-fuel ratio AF0 by the excess air ratio λ. Then, the EGR rate calculation unit 54 calculates, as the EGR rate Regr, a value by dividing the inner-manifold combustion-produced water vapor partial pressure ratio (Pvegr/Pb) by the inner-exhaust-gas combustion-produced water vapor mole fraction $\chi vexL$ at a time of a lean air-fuel ratio. On the other hand, in the case where the air-fuel ratio AF is richer than the theoretical air-fuel ratio AF0, the EGR rate calculation unit 54 directly adopts, as the inner-exhaust-gas combustion-produced water vapor mole fraction $\chi vex0$ at a time of a rich air-fuel ratio, the inner-exhaust-gas combustion-produced water vapor mole fraction. $\chi vex0$ at a time when it is assumed that the air-fuel ratio is the theoretical air-fuel ratio AF0. Then, the EGR rate calculation unit 54 calculates, as the EGR rate Regr, a value by dividing the inner-manifold combustion-produced water vapor partial pressure ratio (Pvegr/Pb) by the inner-exhaust-gas combustion-produced water vapor mole fraction $\chi vex0$ at a time of a rich air-fuel ratio.

1) in the case of lean.

$$\chi vexL = \frac{1}{\lambda} \cdot \chi vex0 \quad (36)$$

$$Regr = \frac{Pvegr}{Pb} \cdot \frac{1}{\chi vexL}$$

2) In the case of theoretical air/fuel ratio or rich $$Regr = \frac{Pvegr}{Pb} \cdot \frac{1}{\chi vex0}$$

Based on the air-fuel ratio AF detected by the air-fuel ratio sensor 18, the EGR rate calculation unit 54 determines whether the air-fuel ratio AF is rich, lean, or the theoretical air-fuel ratio, and calculates the excess air ratio λ. Specifically, in the case where the detection value of the air-fuel ratio AF is smaller than a preliminarily set value (e.g., 14.7) of the theoretical air-fuel ratio AF0 (AF<AF0), the EGR rate calculation unit 54 determines that the air-fuel ratio is rich; in the case where the detection value of the air-fuel ratio AF is larger than the setting value of the theoretical air-fuel ratio AF0 (AF>AF0), the EGR rate calculation unit 54 determines that the air-fuel ratio is lean; in the case where the detection value of the air-fuel ratio AF is equal to the setting value of the theoretical air-fuel ratio AF0 (AF=AF0), the EGR rate calculation unit 54 determines that the air-fuel ratio is the theoretical air-fuel ratio. In addition, the EGR rate calculation unit 54 calculates the excess air ratio λ (=AF/AF0) by dividing the detection value of the air-fuel ratio AF by the preliminarily set value of the theoretical air-fuel ratio AF0.

Alternatively, it may be allowed that based on a fuel correction coefficient Kaf to be utilized in calculating the fuel injection amount, the EGR rate calculation unit 54 determines whether the air-fuel ratio AF is rich, lean, or the theoretical air-fuel ratio, and calculates the excess air ratio λ. For example, the fuel correction coefficient Kaf is a correction coefficient by which a basic fuel injection amount calculated so as to realize the theoretical air-fuel ratio AF0 is multiplied. In the case where Kaf=1, the EGR rate calculation unit 54 determines that the air-fuel ratio is the theoretical air-fuel ratio AF0; in the case where Kaf>1, the EGR rate calculation unit 54 determines that the air-fuel ratio is rich; in the case where Kaf<1, the EGR rate calculation unit 54 determines that the air-fuel ratio is lean. As the excess air ratio λ (=1/Kaf), the EGR rate calculation unit 54 calculates the reciprocal of the fuel correction coefficient Kaf.

Alternatively, it may be allowed that based on a control mode for the air-fuel ratio, the EGR rate calculation unit 54 determines whether the air-fuel ratio AF is rich, lean, or the theoretical air-fuel ratio, and sets the excess air ratio λ. The control modes for the air-fuel ratio include a theoretical air-fuel ratio control mode, a rich control mode, and a lean control mode. In the theoretical air-fuel ratio control mode, in order to raise the purification performance of the three-way catalyst, the air-fuel ratio AF detected by the air-fuel ratio sensor 18 is feedback-controlled so as to be in the vicinity of the theoretical air-fuel ratio AF0. In the rich control mode, which is set at a time when high-load driving is performed, the air-fuel ratio AF is controlled so as to be rich. In the lean control mode, which is set, for example, in order to raise the gasoline mileage, the air-fuel ratio AF is controlled so as to be lean. In the case where the control mode for the air-fuel ratio is the theoretical air-fuel ratio control mode, the rich control mode, or the lean control mode, the EGR rate calculation unit 54 determines that the air-fuel ratio is the theoretical air-fuel ratio, rich, or lean, as the case may be. As described above, the EGR rate calculation unit 54 calculates the excess air ratio λ, based on the detection value of the air-fuel ratio AF, detected by the air-fuel ratio sensor 18, or the fuel correction coefficient Kaf.

3. Embodiment 3

Next, the controller 50 according to Embodiment 3 will be explained. The explanation for constituent parts the same as those in each of Embodiments 1 and 2 will be omitted. The respective basic configurations and processing methods of the internal combustion engine 1 and the controller 50 according to Embodiment 3 are the same as those of the internal combustion engine 1 and the controller 50 according to each of Embodiments 1 and 2; however, Embodiment 3 is different from each of Embodiments 1 and 2 in that the intake-air humidity sensor 5 is not provided in the internal combustion engine 1 and is also different in the detection methods for the intake-air pressure Pa, the intake-air temperature Ta, and the intake-air humidity Hra.

In each of Embodiments 1 and 2, there has been explained the case where the driving-condition detection unit 51 detects the intake-air pressure Pa, based on the output signal of the intake-air pressure sensor 2, detects the intake-air temperature Ta, based on the output signal of the intake-air temperature sensor 4, and detects the intake-air humidity Hra, based on the output signal of the intake-air humidity sensor 5.

However, in Embodiment 3, as the intake-air pressure Pa, the intake-air humidity Hra, and the intake-air temperature Ta, the driving-condition detection unit 51 detects the manifold pressure Pb, the manifold humidity Hrb, and the manifold temperature Tb, respectively, under the condition that the EGR valve 22 for opening or closing the EGR path 21 is closed and hence no exhaust gas is recirculated to the intake manifold 12.

In Embodiment 3, in the case where the EGR valve 22 has continuously been closed for a preliminarily set determination period, the driving-condition detection unit 51 determines that an intake air detection condition has been satisfied. The determination period is set to a period in which after the EGR valve 22 is closed, recirculation exhaust gas in the intake manifold 12 sufficiently decreases. The determination period may be shortened as the intake air amount increases. While the intake air detection condition is satisfied, the driving-condition detection unit 51 detects the intake-air pressure Pa, based on the output signal of the manifold pressure sensor 8, detects the intake-air temperature Ta, based on the output signal of the manifold temperature sensor 9, and detects the intake-air humidity Hra, based on the output signal of the manifold humidity sensor 10. While the EGR valve 22 is closed, no exhaust gas is recirculated into the intake manifold 12; thus, only intake air exists therein. As a result, by use of the pressure, the humidity, and the temperature of the gas in the intake manifold 12, that are detected under the foregoing condition, the inner-intake-air water vapor partial pressure Pva and the inner-intake-air water vapor partial pressure ratio (Pva/Pa) can be calculated.

As is the case with Embodiment 1, based on the intake-air humidity Hra and the intake-air temperature Ta that are detected at a time when the intake air detection condition satisfied, the inner-intake-air water vapor ratio calculation unit 53 calculates the partial pressure Pva of inner-intake-air water vapor, which is the partial pressure of water vapor included in the intake air, so as to calculate the inner-intake-air water vapor partial pressure ratio (Pva/Pa), which is the ratio of the partial pressure Pva of the inner-intake-air water vapor to the intake-air pressure Pa. When the intake air detection condition not satisfied, the inner-intake-air water vapor ratio calculation unit 53 holds and outputs the inner-intake-air water vapor partial pressure ratio (Pva/Pa) that has been calculated at a time when the intake air detection condition was satisfied. The humidity of atmospheric air changes more gently than the humidity in the intake manifold 12 changes due to a change in the EGR rate; therefore, even when the held value is utilized, a large estimation error is prevented from occurring in the EGR rate.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In each of the foregoing embodiments, there has been explained the case in which considering the case where as the fuel for the internal combustion engine 1, gasoline is utilized, it is assumed that the average molecular formula of gasoline and the composition of air are given by each of the equations (4), (22), and (25). However, embodiments of the present invention are not limited to the foregoing case. In other words, it may be allowed that in the average molecular formula of gasoline and the composition of air, stricter values are utilized, that the chemical reaction formula and the respective numbers of moles of molecules in the chemical reaction formula are changed, and that the setting values for calculating the EGR rate Regr such as the conversion constant Kr and the mole conversion constant Kr2 are changed. Moreover, it may be allowed that as the fuel of the internal combustion engine 1, for example, light oil, alcohol, natural gas, or the like is utilized, that the average molecular formula of the fuel is changed in accordance with the kind of the fuel, that the chemical reaction formula and the respective numbers of moles of molecules in the chemical reaction formula are changed, and that the setting values for calculating the EGR rate Regr such as the conversion constant Kr and the mole conversion constant Kr2 are changed.

(2) in each of the foregoing embodiments, there has been explained the case in which the driving-condition detection unit 51 detects the intake-air temperature Ta, based on the output signal of the intake-air temperature sensor 4, and detects the intake-air humidity Hra, based on the output signal of the intake-air humidity sensor 5. However, embodiments of the present invention are not limited to the foregoing case. That is to say, it may be allowed that the driving-condition detection unit 51 obtains information on the intake-air humidity Hra and the intake-air temperature Ta from the air conditioner controller 60. The air conditioner controller 60 is a controller for an air conditioner that performs air-conditioning of a vehicle interior and is connected with the controller 50 for the internal combustion engine 1 through a communication wire. The air conditioner controller 60 is provided with a humidity sensor that detects the humidity of atmospheric air to be taken into the air conditioner and a temperature sensor that detects the temperature of atmospheric air, detects the atmospheric-air humidity and the atmospheric-air temperature based on the output signals of the humidity sensor and the temperature sensor, and transmits information on the atmospheric-air humidity and the atmospheric-air temperature to the controller 50.

(3) In each of the foregoing embodiments, there has been explained the case in which the EGR-rate-utilization control unit 55 changes one of or both of the ignition timing and the opening degree of the EGR valve 22, based on the EGR rate Regr. However, embodiments of the present invention are not limited to the foregoing case. In other words, it may be allowed that the EGR-rate-utilization control unit 55 utilizes the EGR rate Regr for performing control other than control of the ignition timing and the opening degree of the EGR valve 22, for example control of the intake air amount, control in which the variable valve timing mechanism changes the valve opening and closing timings of one of or both of the intake valve 14 and the exhaust valve 15, estimation of the output torque of the internal combustion engine 1, or the like.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine controller for controlling an internal combustion engine, which is provided with an intake path and an exhaust path, a throttle valve for opening and closing the intake path, and an EGR path for recirculating exhaust gas from the exhaust path to an intake manifold that is part of the intake path and is at a downstream side of the throttle valve, the internal combustion engine controller comprising:
   a driving-condition detector, which is an input circuit, that obtains:
      a manifold pressure, which is a pressure of gas in the intake manifold,
      a manifold temperature, which is a temperature of gas in the intake manifold,
      a manifold humidity, which is a humidity of gas in the intake manifold,
      an intake-air pressure, which is a pressure of intake air to be taken into the intake path,
      an intake-air temperature, which is a temperature of the intake air, and
      an intake-air humidity, which is a humidity of the intake air;
   an inner-manifold water vapor ratio calculator, implemented by said at least one processor, that calculates an inner-manifold water vapor partial pressure, which is a partial pressure of water vapor included in gas inside the intake manifold, based on the manifold humidity and the manifold temperature, so as to calculate an inner-manifold water vapor partial pressure ratio, which is the ratio of the inner-manifold water vapor partial pressure to the manifold pressure;
   an inner-intake-air water vapor ratio calculator, implemented by said at least one processor, that calculates an inner-intake-air water vapor partial pressure, which is a partial pressure of water vapor included in the intake air, based on the intake-air humidity and the intake-air temperature, so as to calculate an inner-intake-air water vapor partial pressure ratio, which is the ratio of the inner-intake-air water vapor partial pressure to the intake-air pressure; and
   an EGR rate calculator, implemented by said at least one processor, that calculates an EGR rate, which is a rate of the exhaust gas, recirculated into the intake manifold, to gas in the intake manifold, based on the inner-manifold water vapor partial pressure ratio and the inner-intake-air water vapor partial pressure ratio,
   wherein the internal combustion engine controller controls the internal combustion engine based on the calculated EGR rate.

2. The internal combustion engine controller according to claim 1, wherein the EGR rate calculator calculates a subtraction partial pressure ratio by subtracting the inner-intake-air water vapor partial pressure ratio from the inner-manifold water vapor partial pressure ratio, multiplies the subtraction partial pressure ratio by a preliminarily set conversion constant, and then calculates, as the EGR rate, a value by dividing the multiplication value by a subtraction value obtained by subtracting the inner-intake-air water vapor partial pressure ratio from "1".

3. The internal combustion engine controller according to claim 1, wherein the EGR rate calculator calculates an inner-manifold combustion-produced water vapor partial pressure ratio, which is a ratio of the partial pressure of combustion-produced water vapor included in the recirculated exhaust gas to the manifold pressure, by subtracting the inner-intake-air water vapor partial pressure ratio from the inner-manifold water vapor partial pressure ratio; based on the respective numbers of moles of molecules in a chemical reaction formula at a time when a fuel and wet air combust together and the inner-intake-air water vapor partial pressure ratio, the EGR rate calculator calculates an inner-exhaust-gas combustion-produced water vapor mole fraction, which is a mole fraction of combustion-produced water vapor in the exhaust gas; then, the EGR rate calculator calculates, as the EGR rate, a value by dividing the inner-manifold combustion-produced water vapor partial pressure ratio by the inner-exhaust-gas combustion-produced water vapor mole fraction.

4. The internal combustion engine controller according to claim 1, wherein the EGR rate calculator changes the EGR rate in accordance with an air-fuel ratio of the internal combustion engine.

5. The internal combustion engine controller according to claim 1, wherein the EGR rate calculator calculates the EGR rate at a time when it is assumed that an air-fuel ratio of the internal combustion engine is a theoretical air-fuel ratio, based on the inner-manifold water vapor partial pressure ratio and the inner-intake-air water vapor partial pressure ratio; when the air-fuel ratio is leaner than the theoretical air-fuel ratio, the EGR rate calculator calculates, as a final EGR rate, a value by multiplying the EGR rate at a time when it is assumed that the air-fuel ratio is the theoretical air-fuel ratio by an excess air ratio obtained by dividing the air-fuel ratio by the theoretical air-fuel ratio; when the air-fuel ratio is richer than the theoretical air-fuel ratio, the EGR rate calculator directly calculates, as the final EGR rate, the EGR rate at a time when it is assumed that the air-fuel ratio is the theoretical air-fuel ratio.

6. The internal combustion engine controller according to claim 3, wherein the EGR rate calculator calculates the inner-exhaust-gas combustion-produced water vapor mole fraction at a time assuming that the air-fuel ratio of the internal combustion engine is the theoretical air-fuel ratio, based on the respective numbers of moles of molecules in a chemical reaction formula at a time when a fuel and wet air combust together at the theoretical air-fuel ratio and the inner-intake-air water vapor partial pressure ratio; when the air-fuel ratio is leaner than the theoretical air-fuel ratio, the EGR rate calculator calculates, as the inner-exhaust-gas combustion-produced water vapor mole fraction at a time of a lean air-fuel ratio, a value by dividing the inner-exhaust-gas combustion-produced water vapor mole fraction at a time when it is assumed that the air-fuel ratio is the theoretical air-fuel ratio by an excess air ratio obtained by dividing the air-fuel ratio by the theoretical air-fuel ratio; when the air-fuel ratio is richer than the theoretical air-fuel ratio, the EGR rate calculator directly calculates, as the inner-exhaust-gas combustion-produced water vapor mole fraction at a time of a rich air-fuel ratio, the inner-exhaust-gas combustion-produced water vapor mole fraction at a time when it is assumed that the air-fuel ratio is the theoretical air-fuel ratio.

7. The internal combustion engine controller according to claim 1,
wherein the driving-condition detector detects a relative humidity, as the manifold humidity or the intake-air humidity,
wherein the inner-manifold water vapor ratio calculator calculates a saturated water vapor pressure in the intake manifold, based on the manifold temperature, and then calculates the inner-manifold water vapor partial pressure by multiplying the saturated water vapor pressure by the manifold humidity, and
wherein the inner-intake-air water vapor ratio calculator calculates a saturated water vapor pressure of the intake air based on the intake-air temperature, and then calculates the inner-intake-air water vapor partial pressure by multiplying the saturated water vapor pressure by the intake-air humidity.

8. The internal combustion engine controller according to claim 1, further comprising an EGR-rate-utilization controller that changes one of or both of an ignition timing and an opening degree of an EGR valve for opening and closing the EGR path, based on the EGR rate.

9. The internal combustion engine controller according to claim 1, wherein as the intake-air pressure, the intake-air humidity, and the intake-air temperature, the driving-condition detector detects the manifold pressure, the manifold humidity, and the manifold temperature under the condition that an EGR valve for opening and closing the EGR path is closed and hence no exhaust gas is recirculated to the intake manifold.

10. The internal combustion engine controller according to claim 1, wherein the driving-condition detector obtains information on the intake-air humidity and the intake-air temperature from an air conditioner controller.

11. A method of controlling an internal combustion engine, which is provided with an intake path and an exhaust path, a throttle valve for opening and closing the intake path, and an EGR path for recirculating exhaust gas from the exhaust path to an intake manifold that is part of the intake path and is at a downstream side of the throttle valve, the method comprising:
obtaining a plurality of values output from a plurality of sensors, the plurality of values comprising:
a manifold pressure, which is a pressure of gas in the intake manifold,
a manifold temperature, which is a temperature of gas in the intake manifold,
a manifold humidity, which is a humidity of gas in the intake manifold,
an intake-air pressure, which is a pressure of intake air to be taken into the intake path,
an intake-air temperature, which is a temperature of the intake air, and
an intake-air humidity, which is a humidity of the intake air;
calculating an inner-manifold water vapor partial pressure, based on the obtained manifold humidity and the obtained manifold temperature, so as to calculate an inner-manifold water vapor partial pressure ratio, which is the ratio of the inner-manifold water vapor partial pressure to the manifold pressure;
calculating an inner-intake-air water vapor partial pressure, which is the partial pressure of water vapor included in the intake air, based on the obtained intake-air humidity and the obtained intake-air temperature, so as to calculate an inner-intake-air water vapor partial pressure ratio, which is the ratio of the inner-intake-air water vapor partial pressure to the intake-air pressure;
calculating an EGR rate, which is the rate of the exhaust gas, recirculated into the intake manifold, to gas in the intake manifold, based on the calculated inner-manifold water vapor partial pressure ratio and the calculated inner-intake-air water vapor partial pressure ratio; and
controlling the internal combustion engine based on the calculated EGR rate.

12. The method of claim 11, further comprising:
calculating a subtraction partial pressure ratio by subtracting the inner-intake-air water vapor partial pressure ratio from the inner-manifold water vapor partial pressure ratio;
multiplying the subtraction partial pressure ratio by a preliminarily set conversion constant; and
calculating, as the EGR rate, a value by dividing the multiplication value by a subtraction value obtained by subtracting the inner-intake-air water vapor partial pressure ratio from "1".

13. The method of claim 11, wherein the calculating the inner-manifold water vapor partial pressure comprises:
calculating a saturated water vapor pressure in the intake manifold, based on the manifold temperature; and
calculating the inner-manifold water vapor partial pressure by multiplying the calculated saturated water vapor pressure by the manifold humidity.

14. The method of claim 11, further comprising changing at least one of ignition timing and an opening degree of an EGR valve for opening and closing the EGR path, based on the calculated EGR rate.

15. An internal combustion engine controller for controlling an internal combustion engine, the internal combustion engine controller comprising:
a driving-condition detector, which is an input circuit, that obtains:
a manifold pressure, which is a pressure of gas in an intake manifold,
a manifold temperature, which is a temperature of gas in the intake manifold,
a manifold humidity, which is a humidity of gas in the intake manifold,
an intake-air pressure, which is a pressure of intake air to be taken into an intake path,
an intake-air temperature, which is a temperature of the intake air, and
an intake-air humidity, which is a humidity of the intake air;
an inner-manifold water vapor ratio calculator, implemented by said at least one processor, that calculates an inner-manifold water vapor partial pressure, which is a partial pressure of water vapor included in gas inside the intake manifold, based on the manifold humidity and the manifold temperature, so as to calculate an inner-manifold water vapor partial pressure ratio, which is the ratio of the inner-manifold water vapor partial pressure to the manifold pressure;

an inner-intake-air water vapor ratio calculator, implemented by said at least one processor, that calculates an inner-intake-air water vapor partial pressure, which is a partial pressure of water vapor included in the intake air, based on the intake-air humidity and the intake-air temperature, so as to calculate an inner-intake-air water vapor partial pressure ratio, which is the ratio of the inner-intake-air water vapor partial pressure to the intake-air pressure;

an EGR rate calculator, implemented by said at least one processor, that calculates an EGR rate, which is a rate of an exhaust gas, recirculated into the intake manifold, to gas in the intake manifold, based on the inner-manifold water vapor partial pressure ratio and the inner-intake-air water vapor partial pressure ratio; and an EGR-rate-utilization controller that changes at least one of ignition timing and an opening degree of an EGR valve for opening and closing the EGR path, based on the EGR rate, wherein the EGR rate calculator calculates a subtraction partial pressure ratio by subtracting the inner-intake-air water vapor partial pressure ratio from the inner-manifold water vapor partial pressure ratio, multiplies the subtraction partial pressure ratio by a preliminarily set conversion constant, and then calculates, as the EGR rate, a value by dividing the multiplication value by a subtraction value obtained by subtracting the inner-intake-air water vapor partial pressure ratio from "1".

* * * * *